(12) United States Patent
Clark

(10) Patent No.: US 10,943,463 B1
(45) Date of Patent: Mar. 9, 2021

(54) TECHNOLOGIES FOR ASSISTANCE AND SECURITY SERVICES

(71) Applicant: Agape Grace Clark, Laurel, MS (US)

(72) Inventor: Agape Grace Clark, Laurel, MS (US)

( * ) Notice: Subject to any disclaimer, the term of this patent is extended or adjusted under 35 U.S.C. 154(b) by 41 days.

(21) Appl. No.: 16/278,390

(22) Filed: Feb. 18, 2019

Related U.S. Application Data

(60) Provisional application No. 62/632,373, filed on Feb. 19, 2018.

(51) Int. Cl.
  *G08B 21/18* (2006.01)
  *G08B 19/00* (2006.01)
  (Continued)

(52) U.S. Cl.
  CPC .......... *G08B 25/016* (2013.01); *G08B 19/00* (2013.01); *G08B 21/02* (2013.01);
  (Continued)

(58) Field of Classification Search
  CPC ....... H04W 4/90; H04W 36/14; H04W 36/24; H04W 4/024; H04W 4/029; H04W 4/21; H04W 4/23; H04W 76/10; H04W 84/12; H04W 40/12; H04W 48/14; H04W 48/18; H04W 72/1215; H04W 88/06; G06F 3/14; G06Q 30/0205; G06Q 50/01; G06Q 50/265; G09G 2354/00; G09G 2370/022; G09G 2370/042; G09G 2380/06; G09G 2380/08; H04L 67/306; H04L 45/24; H04L 45/308; H04L 45/70; H04L 47/787; H04L 47/803; H04M 3/424; H04M 3/5116; Y02D 70/1224; Y02D 70/1242; Y02D 70/1244; Y02D 70/1262; Y02D 70/142; Y02D 70/144; Y02D 70/146; Y02D 70/164; Y02D 70/23; Y02D 70/34; G08B 25/016;
  (Continued)

(56) References Cited

U.S. PATENT DOCUMENTS

| | | | | |
|---|---|---|---|---|
| 2010/0008291 A1* | 1/2010 | LeBlanc | ................. | H04L 45/70 370/328 |
| 2014/0317710 A1* | 10/2014 | Sager | ..................... | G08B 25/00 726/7 |

(Continued)

*Primary Examiner* — Dionne Pendleton
(74) *Attorney, Agent, or Firm* — Polsinelli PC

(57) ABSTRACT

Systems, methods, and computer-readable media are provided for personal emergency assistance. An example method can include detecting a need for assistance associated with a user; determining a location associated with the user and a type of assistance needed; selecting a communications interface on a device associated with the user for transmitting an assistance request over a network; transmitting, to a destination system associated with an assistance service, the assistance request via the communications interface selected, the assistance request specifying the location associated with the user and the type of assistance needed; exchanging assistance updates between the device and destination system, the assistance updates comprising location updates, event updates, a status of the assistance request, and/or a status of an assistance response; and providing, by the device, assistance information comprising at least a portion of the assistance updates, the assistance information being provided via a display and/or speaker of the device.

21 Claims, 8 Drawing Sheets

(51) Int. Cl.
 *G08B 25/01* (2006.01)
 *H04W 4/029* (2018.01)
 *G08B 21/02* (2006.01)
 *G08B 21/04* (2006.01)
 *G08B 23/00* (2006.01)

(52) U.S. Cl.
 CPC ....... *G08B 21/0208* (2013.01); *G08B 21/043* (2013.01); *G08B 21/0438* (2013.01); *G08B 21/0469* (2013.01); *G08B 21/0476* (2013.01); *G08B 23/00* (2013.01); *H04W 4/029* (2018.02)

(58) Field of Classification Search
 CPC .... G08B 19/00; G08B 21/02; G08B 21/0208; G08B 21/043; G08B 21/0438; G08B 21/0469; G08B 21/0476
 See application file for complete search history.

(56) References Cited

U.S. PATENT DOCUMENTS

| | | | |
|---|---|---|---|
| 2017/0124853 A1* | 5/2017 | Mehta | H04W 4/90 |
| 2018/0199179 A1* | 7/2018 | Rauner | G08B 25/10 |
| 2020/0077250 A1* | 3/2020 | Gideon, III | H04W 4/029 |
| 2021/0012638 A1* | 1/2021 | Jalilian | G01N 21/3504 |

\* cited by examiner

TECHNOLOGIES FOR ASSISTANCE AND SECURITY SERVICES

CROSS-REFERENCE TO RELATED APPLICATIONS

This application claims the benefit of, and priority to, U.S. Provisional Patent Application No. 62/632,373 filed on Feb. 19, 2018, entitled "SAFE INSURANCE", the contents of which are hereby expressly incorporated by reference in their entirety.

TECHNICAL FIELD

The present technology pertains to personal emergency and security systems.

BACKGROUND

Emergency situations can occur unexpectedly and frequently leave a person stranded, in danger, or in dire need of speedy help. From kidnappings to personal and terrorist attacks, from accidents to medical emergencies, from stranded vehicles to property theft—we are all vulnerable to emergencies. When an emergency does occur, a person's ability to obtain prompt help from others can mean the difference between life and safety on one hand, and death, injury, or property loss on the other. Unfortunately, current personal emergency response systems lack a sufficient degree of flexible, efficiency, and dependability to ensure personal safety and speedy help in a wide array of emergency situations. As a result, people can face unnecessary or prolonged risks to safety, health, and property.

For example, given the increasing availability and capabilities of smartphones, people commonly rely on smartphones to seek assistance in emergency situations. However, smartphones are often too unreliable for emergency situations, as they can lose battery power or communications service during an emergency, leaving the person unable to obtain speedy help. Smartphones can also be too inefficient in emergency situations as they typically do not provide streamlined options for quickly pursuing different avenues of help or the most suitable avenue of help for a particular emergency situation. To illustrate, smartphones may require a person to perform a number of time-consuming steps to access the appropriate application or smartphone features to seek help, and generally rely on the person to know or remember who to contact during an emergency (e.g., the most suitable type of assistance provider for that emergency, the most suitable emergency dispatcher for that emergency, the most-suitably located assistance provider for that emergency, etc.), how to contact them (e.g., what number to call, etc.) and the most accurate and relevant information (e.g., accurate location, accurate description of emergency and environment, etc.) that should be conveyed to the assistance provider to obtain speedy help. This problem is aggravated when a person experiences memory or cognitive impairment (e.g., due to health conditions, stress, or use of certain drugs or medications).

Various personal emergency response systems, such as medical alert systems, roadside assistance systems, and home invasion protection systems, are also available for users to seek help during an emergency. However, such systems are limited and in many cases inefficient and unsuitable for certain emergency situations. For example, such personal emergency systems lack automation and require a person to use a particular device, such as a smartphone or notification device, to communicate their help requests to a personal emergency center. As previously explained, such user devices are susceptible to loss of power and communications service, lack redundancy, often require multiple time-consuming steps to seek help, and in many cases rely on the person to know or remember how to establish contact with the personal emergency center. Moreover, such personal emergency systems are generally designed or suitable for a limited type of emergency situations. For example, medical alert systems are typically designed only for medical emergencies while home intrusion protection systems are designed only for home invasions and roadside assistance systems are designed only for roadside emergencies—none providing an effective, reliable and comprehensive solution for many common emergencies.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
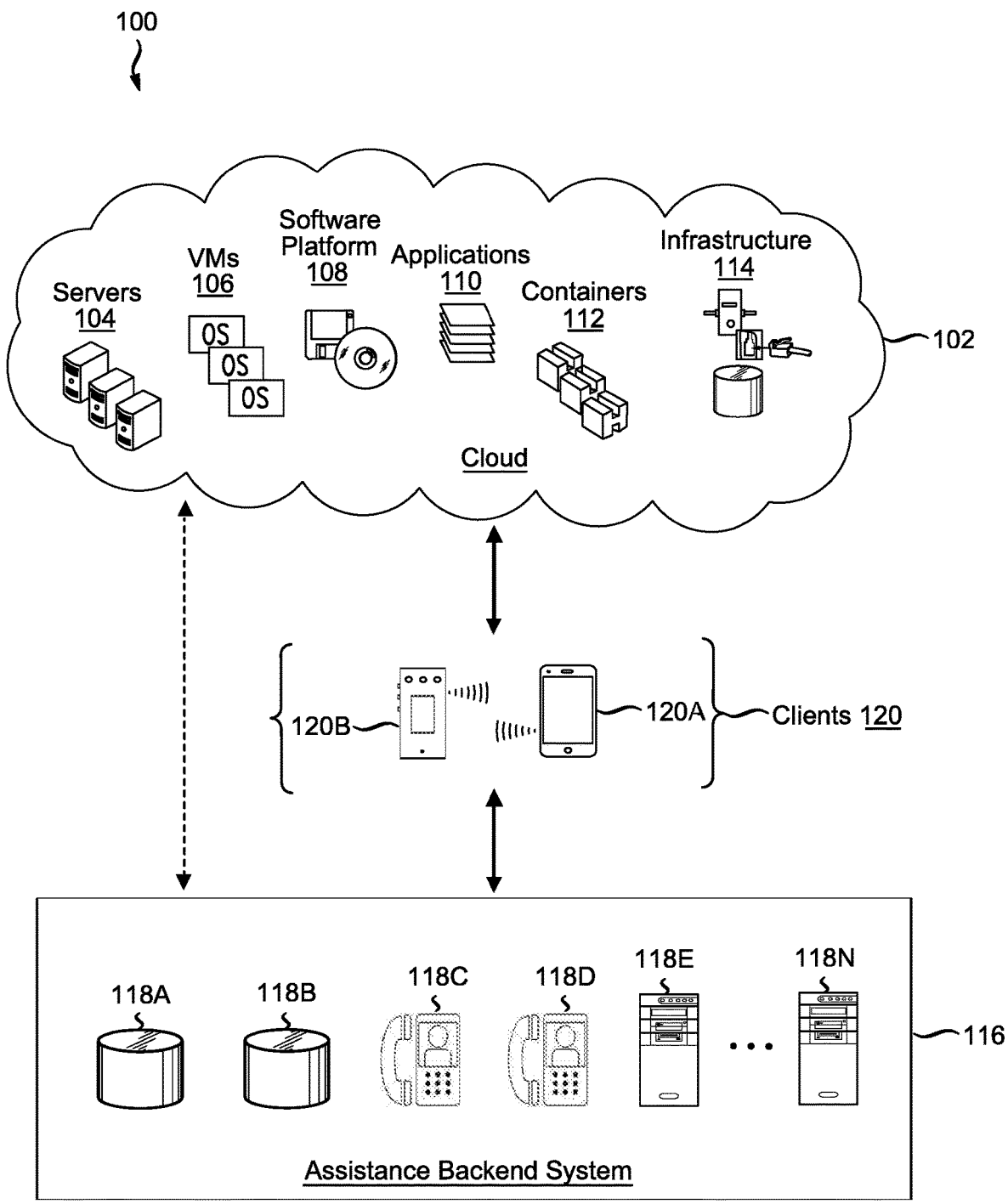
FIG. 1 illustrates an example architecture of a personal emergency assistance system, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously mentioned, personal emergency systems are generally limited and in many cases inefficient and unsuitable for a number of emergency situations. For example, personal emergency systems lack automation and require a person to use a particular device, such as a smartphone or notification device, to communicate their help requests to a personal emergency center. Such user devices are susceptible to loss of power and communications service, lack redundancy, often require multiple time-consuming steps to seek help, and in many cases rely on the person to know or remember how to establish contact with the personal emergency center. Moreover, personal emergency systems are typically designed or suitable for a limited type of emergency situations. For example, medical alert systems are commonly designed only for medical emergencies while home intrusion protection systems are designed only for home invasions and roadside assistance systems are designed only for roadside emergencies—none providing an effective, reliable and comprehensive solution for many common emergencies.

The approaches herein can provide a personal emergency system and application that enables users to obtain fast and effective assistance for a wide array of emergencies. The approaches herein can allow users to communicate assistance or help requests to remote parties or systems in an extremely efficient, reliable, and covert (e.g., so as to not track unwanted attention) manner using redundant, reliable, and fast technologies and techniques for assistance communications. The approaches herein can provide various degrees of automation for requesting assistance, communicating assistance-related data, and receiving assistance, and can support a large variety of emergency situations. Moreover, the systems and techniques herein can significantly reduce the risk of a user's device losing power or communications service during an emergency by providing redundancy and distributing usage of resources such as power/battery, communication resources, etc. The approaches herein can also significantly increase the speed for communicating assistance information (e.g., assistance needs or requests, event information, user information, etc.) and receiving assistance by leveraging multiple devices, applications, components, networks, etc.

Figure 6:
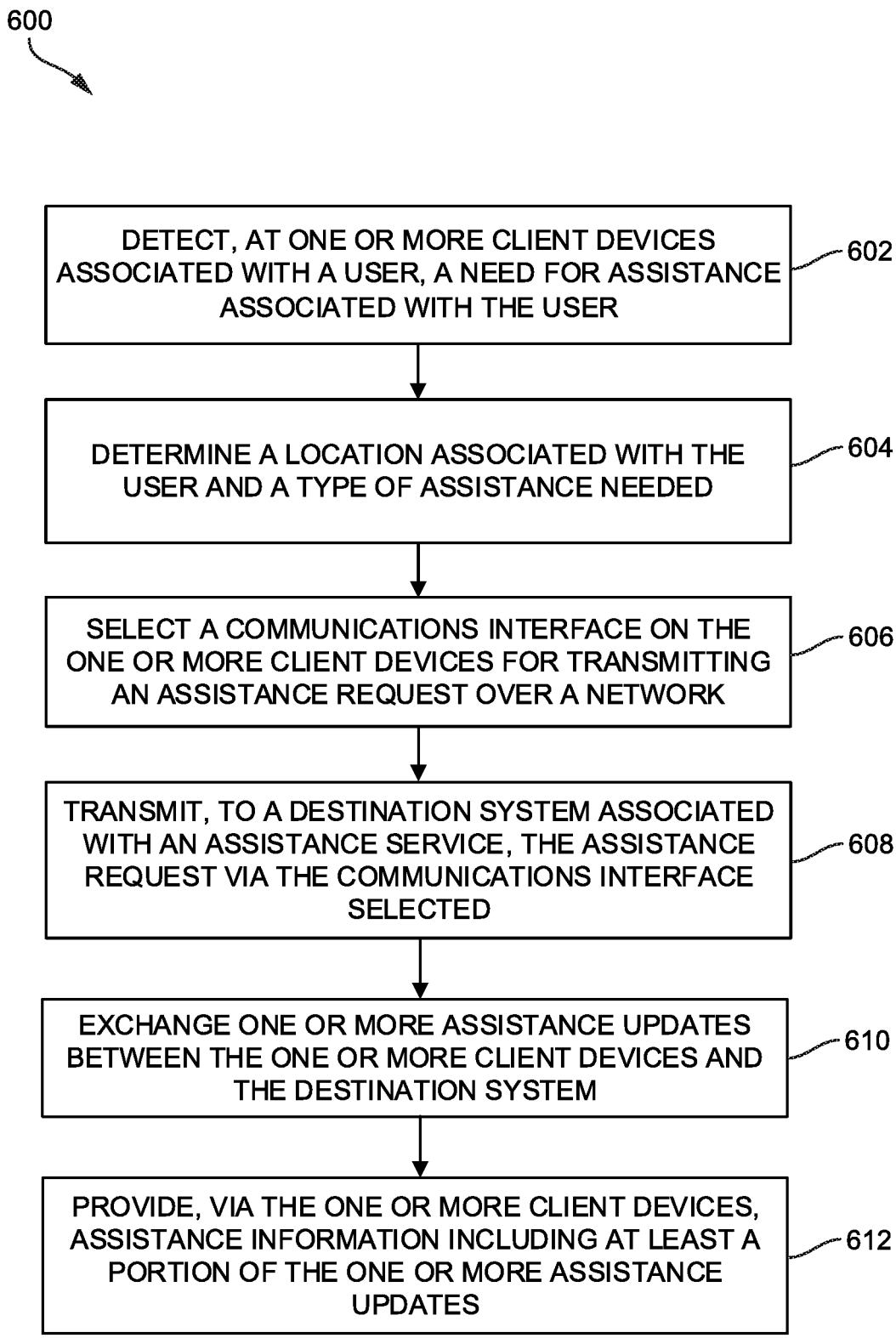
FIG. 6 illustrates an example method for requesting assistance in an emergency situation.
Figure 7:
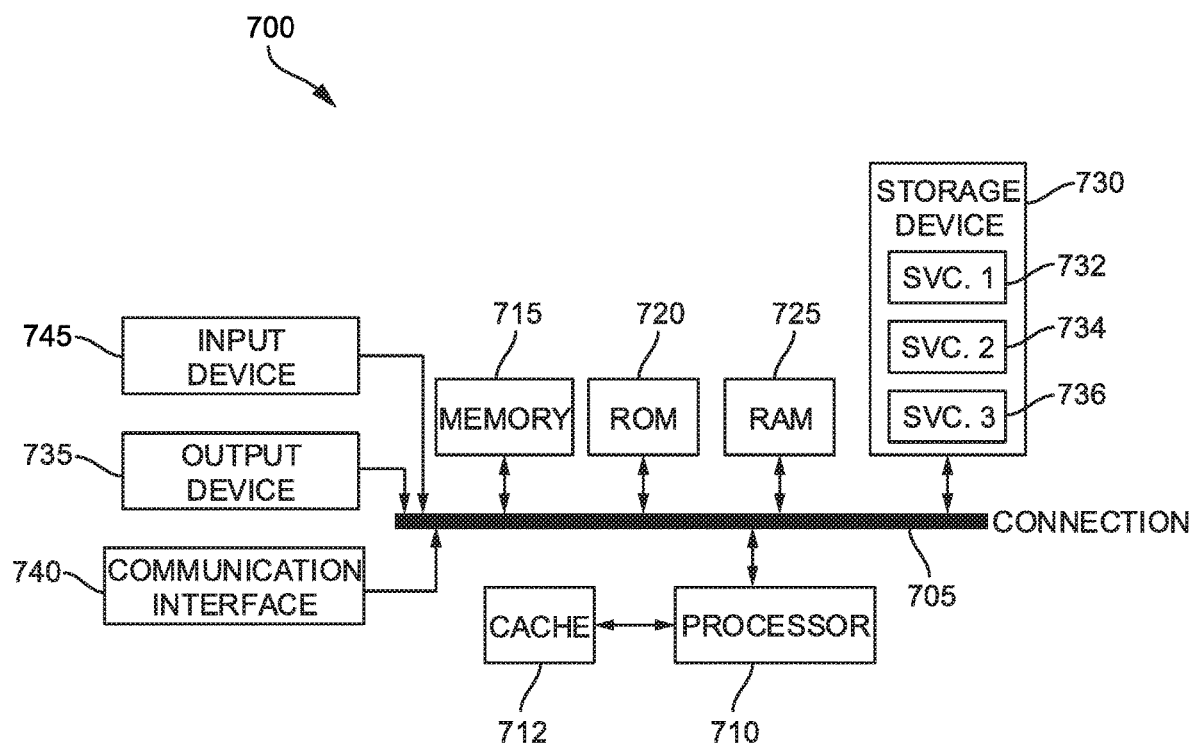
FIG. 7 illustrates an example computing device architecture, in accordance with some examples.

The present disclosure provides systems, methods, and computer-readable media for personal emergency assistance, security and safety. The present technology will be described in the following disclosure as follows. The discussion begins with a description of example personal emergency assistance systems, architectures, applications, communications and use case scenarios, as illustrated in FIGS. 1 through 5B. A description of an example method for personal emergency assistance, as illustrated in FIG. 6, will then follow. The discussion concludes with a description of an example computing device architecture, as illustrated in FIG. 7, including example hardware components suitable for hosting software applications and performing computing operations, such as personal emergency assistance operations. The disclosure now turns to FIG. 1.

FIG. 1 illustrates an example architecture 100 of a personal emergency assistance system. In this example, the architecture 100 includes client devices 120A, 120B (collectively "120" hereinafter), which a user can use to communicate with an assistance backend system 116 to request help or emergency services, report data relevant to an emergency event (e.g., location, time, date, user identification information such as name and/or profile, information about the environment (e.g., park, street, garage, raining, dark, light, etc.), contact information, description of event, description of the type of help or assistance requested, event updates, context information, report injuries or state of the user or associated property, etc.), respond to communications received from the assistance backend system 116, send and/or receive alerts or notifications, and so forth.

The client devices 120 can include any electronic device having localization and/or communication capabilities, such as a device having global positioning system (GPS) capabilities for obtaining location information (e.g., coordinates), cellular and triangulation capabilities, wireless capabilities (e.g., WIFI, WI-FI direct, near-field communications (NFC), Bluetooth, radio capabilities, cellular capabilities, etc.), capabilities for determining location information based on wireless connections, one or more sensors (e.g., camera or image sensors, audio sensors, radars, etc.), tracking capabilities, GIS data collection capabilities, communications and signaling components (e.g., a transceiver, a network interface, a radio antenna, a Bluetooth transceiver, etc.), etc. Non-limiting examples of client devices 120 can include laptops, smartphones, GPS units, tablet computers, Internet of things (IoT) devices, smart wearables (e.g., smart watches, head-mounted displays (HMDs), smart goggles, etc.), USB (universal serial bus) devices with localization capabilities (e.g., a USB GPS stick with GPS capabilities, USB sticks with cellular triangulation capabilities, etc.), cameras, sensors, etc.

In some examples, client devices 120A and 120B can be different types of devices. For example, client device 120A can be a smartphone and client device 120B can a USB GPS stick. In other examples, client devices 120A and 120B can be the same type of device. For example, in some cases, client devices 120A and 120B can both be smartphones or tablet computers.

In some implementations, at least one of the client devices 120 can include one or more sensors for capturing data associated with an event. For example, client device 120A and/or client device 120B can include a camera for capturing video or images of people (e.g., a perpetrator, a witness, themselves, etc.), objects (e.g., weapons, street signs, animals, vehicles, buildings, etc.), landmarks (e.g., parks, hospitals, cross-streets, locales, etc.), the surrounding environment, etc. As another example, the client device 120A and/or client device 120B can include a microphone for recording audio associated with an event (e.g., voices, speech, noises, etc.), a speaker for outputting audio (e.g., an alarm during an emergency event, call audio, speech recognition audio, audio instructions, etc.), one or more sensors for tracking movement (e.g., motion sensors, inertial measurement units, radars, etc.), and so forth.

In some cases, at least one of the client devices 120 (and/or the cloud 102 as explained herein) can include software and/or logic to perform detection or recognition operations based on data collected by one or more sensors (e.g., an audio sensor, an image or camera sensor, a radar, a motion sensor, a proximity sensor, a gyroscope, an inertial measurement unit, etc.) on at least one of the client devices 120. For example, client device 120A and/or client device 120B can include tools or software to perform object recognition to recognize objects associated with an event (e.g., weapons, vehicles, buildings, animals, landmarks, clothing apparel, etc.), facial recognition to recognize people associated with an event (e.g., a perpetrator, a witness, a person providing assistance, etc.), smart scene recognition to recognize features of a scene, gesture recognition to recognize certain gestures (e.g., threatening gestures made by an individual, help gestures, motion gestures, communicative gestures, etc.), human emotion recognition to recognize human emotions (e.g., anger, fear, sadness, etc.), threat detection, image recognition, sound localization, noise recognition, speech recognition, etc.

For example, at least one of the client devices 120 can use various analysis and recognition technologies to identify humans in an image, video recording, and/or audio recording; human characteristics (e.g., emotions, gestures, clothing, etc.); objects in an image and/or video recording (e.g., cars, weapons, other devices such as cameras or smartphones, doors, windows, roads, street signs, etc.); events in an image, video recording and/or audio (e.g., a fire, a flood, a burglary, an assault, a car accident, a robbery, vandalism, a breach in an area, etc.); activities of humans in an image or video recording (e.g., conversations, confrontations, walking, exchanging objects, running, driving, firing a weapon, recording an image or video, etc.); location information (e.g., location of an object, proximity of a human to another human or object, proximity of an object to a human or another object, sound localization, etc.), and so forth.

The detection or recognition calculations can be communicated to the assistance backend system 116, the cloud 102, and/or any other system or person providing assistance (e.g., assistance personnel or agents, law enforcement systems or personnel, emergency services systems or personnel, contacts, investigators, etc.). The client devices 120 can also receive detection or recognition results generated by a remote system such as the cloud 102. The client devices 120 can use such detection or recognition results to supplement the detection or recognition data from the client devices 120 or to offload detection or recognition operations to the remote system in order to conserve resources (e.g., power/battery, compute resources, etc.) and/or obtain potentially more reliable or accurate results (for example if the remote system has greater compute capacity).

The detection or recognition calculations can also be used to provide the user associated with the client devices 120 (and/or any other user, system, or entity) helpful or relevant information ascertained from the detection or recognition calculations, such as a notification or assessment of a threat (e.g., a threat from another person, a threat from a natural event, etc.), information about people or other things recognized or detected (e.g., animals, weapons, buildings, vehicles, danger zones, etc.), a notification that a person is in distress (e.g., determined based on audio or sound, image data, impact recognition results, etc.), and so forth. For example, the client device 120A can use sensor data to detect and inform the user of a threat posed by a nearby person, which can be determined based on, for example, gesturing by the person (e.g., aggressive or forceful gesturing), an object carried by the person (e.g., a weapon), a movement of the person (e.g., nervous or erratic movement), a facial recognition result generated for the person (e.g., an identification of a wanted criminal or a previous attacker), captured audio or speech (e.g., verbal threats, aggressive sounds or noises, discharge of weapon, impact noises, etc.), a surrounding environment (e.g., dark neighborhood with no exits, high crime area, etc.), and so forth.

Such information can not only help the user mitigate or avoid danger or threats, but can also help others when providing assistance to the user. For example, such information can be provided to another user, entity, and/or system (e.g., assistance backend system 116) when requesting assistance so those providing assistance have information that may help them provide the fastest, safest, and most effective assistance. In some cases, such information can be used to proactively take certain actions, such as proactively requesting assistance, notifying someone of a potential threat or emergency, initiating an alarm or call, prompting the user to call for help or take a certain action, broadcast a distress signal, etc. For example, information generated indicating that a person is in distress can be used to proactively send a signal or request for assistance to assistance backend system 116 and/or any other system, entity, or user. As another example, such information can be used to inform the assistance backend system 116 or any other system or entity of a potential threat or emergency. Such proactive notification or alert technologies can help a user request and/or receive assistance faster, which can have a significant impact on the outcome particularly in certain emergencies where small differences in time can make a big difference.

The client devices 120 can communicate with the assistance backend system 116 over one or more networks. In some implementations, the client devices 120 can also communicate with other remote devices or third-party systems (e.g., police emergency systems, emergency services dispatchers, towing service systems, medical emergency systems, the Internet, etc.) over one or more networks. The one or more networks can include, for example, a private network (e.g., a local area network (LAN), a virtual private network (VPN), etc.), a public network (e.g., the Internet, a public service provider network, a public WIFI, etc.), and/or any combination thereof. Moreover, the client devices 120 can communicate with the assistance backend system 116 using any wireless communication protocols or technologies, such as radio, cellular, WIFI, etc.

In some cases, the client devices 120 can support a number of different communications capabilities and protocols, which for redundancy can be used to provide different channels or communications options that the client devices 120 can use when requesting assistance. For example, client device 120A may provide support for specific types of cellular communication technologies (e.g., Long Term Evolution (LTE), 4G, 5G, etc.) while the client device 120B may provide support for other types of cellular communication technologies (e.g., General Packet Radio Service (GPRS), Global System for Mobile (GSM) communications, etc.). In this example, if one client device (e.g., 120A) does not have sufficient cellular coverage or connectivity to successfully transmit an assistance request during an emergency, the other client device (e.g., 120B) could potentially have sufficient cellular coverage or connectivity via a different channel to successfully transmit the assistance request. This configuration can provide an additional layer of redundancy when seeking assistance so the user is not prevented from seeking assistance by a lack of connectivity or coverage on a client device or so the user does not lose valuable time in attempting to make a successful connection on one client device to send an assistance request.

In some implementations, the client devices 120 can each individually or separately communicate with the assistance backend system 116, as previously explained. For example, in some cases, the client devices 120 can simultaneously send assistance requests via one or more of their respective communications channels for added redundancy in case one of the client devices is unable to establish sufficient connectivity and/or in case the assistance request from one client device fails to reach the target destination. The client devices 120 can use the same type of communication channel or protocol (e.g., LTE, 4G, WIFI, etc.) to send the simultaneous assistance requests or may use different types of communication channels or protocols (e.g., one client device uses LTE and the other uses WIFI or GSM) to achieve a higher probability that at least one of the assistance requests will reach the destination/target.

In other examples, the client devices 120 can coordinate which client device(s) should send an assistance request, when (e.g., at what time or interval, in what order, etc.) should the client device(s) send the assistance request, what communications channel(s) or protocol(s) should be used by the client device(s) to send the assistance request, etc. In some cases, a client device can iteratively check its different communication channels or interfaces to determine which channels or interfaces have sufficient connectivity to send the assistance request and select one or more specific channels or interfaces to send the assistance request. For example, a client device can check its cellular connectivity or coverage and, if the client device determines it has sufficient cellular connectivity or coverage, it can send the assistance request using its cellular connection. If, on the other hand, the client device determines that it does not have sufficient cellular connectivity or coverage, it can check another channel or interface, such as a WIFI or radio channel or interface, to determine if it should instead use the other channel or interface. In this way, the client device can loop through its different communications channels or interfaces to find the optimal channel or interface to use when sending the assistance request.

In some cases, a client device can prioritize communication channels or interfaces and iteratively attempt to use each channel or interface based on the priorities until a sufficient connection is established through one of the channels or interfaces or until the client device loops back to the first channel or interface to retry using that first channel or interface. The channels or interfaces can be prioritized in advance (e.g., prior to an emergency event or before the user or client device attempts to initiate an assistance request) or dynamically as the assistance request is initiated. For example, in some cases, a client device can maintain a prioritized list of channels or interfaces at the client device and use that prioritized list as the default or baseline priority order. The client device can also be configured to periodically (e.g., at specific intervals, at specific events such as a recognized threat or a drop in connectivity, etc.) check the connectivity and status of its channels or interfaces and make any adjustments to the prioritized list so the list is more current when an event occurs.

In some implementations, one of the client devices 120 can be configured to transmit or relay communications to the assistance backend system 116 (and/or any other systems) for the client devices 120. For example, client device 120A can be configured to communicate data (send and/or receive) with the assistance backend system 116 for both the client device 120A and the client device 120B. In this example, client device 120A and client device 120B can be configured to communicate wirelessly with each other to exchange or share data with each other.

The wireless connection between the client device 120A and the client device 120B can allow the client device 120A to relay to the assistance backend system 116 data from the client device 120A and/or vice versa. The wireless connection between the client devices can also allow one client device (e.g., 120A) to refine data (e.g., location information, event information, user information, etc.) to be reported to the assistance backend system 116 based on data received from the other client device (e.g., 120B). For example, the client device 120A can receive GPS data from the client device 120B and use that data to refine the location of the user based on other information at the client device 120A (e.g., triangulation data, WI-FI based localization data, tracking data, etc.).

In some implementations, the wireless connection between the client devices 120 can allow the client devices 120 to distribute operations (e.g., localization operations, recognition operations, data collection operations, signaling operations, communication operations, alert or notification operations, map operations, etc.) between the client devices 120 in order to provide redundancy, distribute power consumption, limit battery use at each device, distribute resource consumption (e.g., compute resource consumption, memory, storage, network or interface bandwidth, etc.), and so forth. For example, in some cases, localization operations can be distributed between the client devices 120 to conserve battery. To illustrate, client device 120B may handle the collection of GPS data, and the client device 120A may receive the GPS data from the client device 120B and perform other localization operations, such as triangulation, cross-checking GPS coordinates with physical locations (e.g., cities, states, countries, locales, buildings, addresses, businesses, local emergency response departments or agencies, etc.), to refine the location information generated.

The wireless connection and communications between the client devices 120 can be established via one or more wireless protocols, such as Bluetooth, WI-FI, WI-FI direct, near-field communication (NFC), Zigbee, Z-Wave, cellular (e.g., GPRS, 3G/4G/5G, LTE, etc.), radio (RF), and/or any other suitable wireless protocol. In some cases, one of the client devices 120 can be configured as a master device and another can be configured as a slave device. The master device can handle certain functions or operations on behalf of both client devices, such as communications to and from the assistance backend system 116 (and/or any other system); operations for collecting, analyzing, and/or manipulating data; operations for performing calculations such as localization operations (e.g., refining location information), detection and/or recognition operations (e.g., object recognition, scene recognition, facial recognition, speech recognition, gesture recognition, image recognition, etc.), etc.

In some implementations, the slave device (e.g., 120B) can serve as a fault tolerance or redundancy point for operations and/or communications associated with the client devices 120. For example, the slave device (e.g., 120B) can be configured to detect any errors or failures experienced by the master device (e.g., 120A), such as connectivity errors/failures, battery issues, processing errors, hardware errors, etc.; and take over the master role when the master device (e.g., 120A) experiences such a problem(s). As the new master device, the device (e.g., 120B) can initiate and/or continue communications with the assistance backend system 116 even if the previous master device (e.g., 120A) is unable to do so. In some implementations, the slave device (e.g., 120B) can perform operations and communicate with the assistance backend system 116 even if the master device (e.g., 120A) has not experienced any problems and has connectivity to communicate with the assistance backend system 116. For example, the slave device (e.g., 120B) can report to the assistance backend system 116 its own collected or calculated data (e.g., localization information, event information, user information, etc.) either in lieu of the master device reporting that data or in addition to the master device reporting that data (e.g., for redundancy or backup).

The assistance backend system 116 can include electronic devices 118A-N for storing data (e.g., data and requests from the client devices 120, data collected from other sources such as the Internet and government sources, event statistics, user or subscriber information, map information, location information, data and analytics generated by the assistance backend system 116, etc.), analyzing and/or processing data, planning emergency or event response strategies, dispatching help, communicating with the client devices 120, communicating with other systems or entities such as government entities (e.g., law enforcement, emergency services agencies, etc.), generating and transmitting notifications and alerts, etc. The electronic devices 118A-N can include, for example, storage systems (118A, 118B), telephone systems (118C, 118D), servers (118E, 118N), communications devices (e.g., routers, switches, antennas, network interfaces, etc.), and/or any other electronic computing device.

In some cases, the assistance backend system 116 can reside within a centralized location such as a datacenter, a private or campus network, a call center, etc. In other cases, the assistance backend system 116 can be distributed across multiple geographic locations and/or computing systems or environments. For example, the assistance backend system 116 can include datacenters, call centers, networks, facilities, etc., in different regions, zones, jurisdictions, municipalities, buildings, locations, areas, etc. In some cases, the assistance backend system 116 can include systems or centers (e.g., datacenters, call centers, etc.) across a number of locations or regions and each local or regional center can service assistance requests within one or more specific geolocations or geo-fences. In other cases, the assistance backend system 116 can include systems or centers across a number of locations or regions, but which specific system or center services an assistance request can be determined based on one or more factors, such as a proximity of the system or center and other systems or centers to the location of the event associated with the assistance request, a workload or capacity (e.g., bandwidth, number of pending requests, availability of personnel in the associated area, network connectivity, etc.) of the various systems or centers, a type of assistance requested, etc.

The assistance backend system 116 can implement multiple or redundant communication channels to provide the client devices 120 different options for communication. For example, the assistance backend system 116 can implement multiple cellular interfaces and protocols (e.g., LTE, 4G, 5G, GSM, GPRS, etc.), multiple radio interfaces or channels, different communication routes (e.g., in case a hop in one route experiences a failure or delay), different routers and/or networks, etc. This way, the assistance backend system 116 has different or redundant means for communicating with the client devices 120 and can adapt to connectivity issues experienced by some channels or networks. In some cases, the assistance backend system 116 can maintain one or more radio antennas configured to listen for broadcast, over-the-air signals over one or more RF channels. For example, the client devices 120 can be configured to broadcast RF signals with assistance requests, which the assistance backend system 116 can listen to and receive to initiate the assistance process. The broadcast signals can be used, for example, in cases where the client devices 120 are otherwise unable to establish communications through other channels.

Moreover, the assistance backend system 116 can be configured to use data received from the client devices 120 to track the user associated with the client devices 120 even as the user moves or travels to another location. The assistance backend system 116 can use tracking results or estimates to update the location of the user at various times. The assistance backend system 116 can also use the data received from the client devices 120 to track or update conditions (e.g., environment conditions, threat conditions, safety conditions, health conditions, activity, etc.) associated with an event. In some cases, the assistance backend system 116 can check a connectivity status of the client devices 120 and determine a probability that the client devices 120 have attempted but failed to communicate with the assistance backend system 116.

For example, if the assistance backend system 116 receives an assistance request from a client device, the assistance backend system 116 can maintain the connection or session open with the client device. If the assistance backend system 116 determines that it has not received any further communications or replies from the client device after a threshold period of time, the assistance backend system 116 can determine that some communications may have failed or one or more packets may be missing. If the assistance backend system 116 determines that a communication has likely failed or one or more packets are likely missing, it can attempt to communicate with the client device to reestablish connectivity/communications or prompt the client device to make additional communication attempts (via the same or a different communication channel).

The assistance backend system 116 can include personnel and/or agents (e.g., virtual agents or bots, human agents, etc.) who can help attend to assistance requests and matters. The personnel and/or agents can, for example, make and answer calls and messages, dispatch services and/or personnel to a location, communicate with third parties or entities (e.g., law enforcement, ambulance services, firefighter services, towing services, emergency personnel, locales in one or more areas, emergency contacts, witnesses, etc.), manage assistance requests and services, provide notifications, relay event or emergency information, provide instructions or assistance over the phone, etc.

In some cases, the client devices 120 and/or the assistance backend system 116 can communicate with a cloud 102 to obtain specific data from the cloud 102, obtain certain services from the cloud 102, offload certain services or operations to the cloud 102, use the cloud 102 as a data or storage backup, etc. The client devices 120 and/or the assistance backend system 116 can communicate with the cloud 102 via one or more networks, such as a private network (e.g., a LAN, a VPN, etc.), a public network (e.g., the Internet, a core provider network, etc.), and/or both.

The cloud 102 can include one or more private, public, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure 114. The infrastructure 114 can include various types of nodes and/or hardware, such as compute nodes, storage nodes, network nodes, management systems, etc. In some cases, the infrastructure 114 can include a controller for managing the client devices 120, the assistance backend system 116, the assistance services provided by the assistance backend system 116, etc.

The cloud 102 can provide various cloud computing services via the cloud elements 104-114, such as software as a service (SaaS) (e.g., collaboration services, email services, enterprise services, content services, communication services, etc.), infrastructure as a service (IaaS) (e.g., security services, networking services, systems management services, etc.), platform as a service (PaaS) (e.g., web services, streaming services, application services, etc.), function as a service (FaaS), cloud-based management services, and other types of services such as desktop as a service (DaaS), information technology management as a service (ITaaS), managed software as a service (MSaaS), mobile backend as a service (MBaaS), etc.

In some cases, client devices 120 and/or the assistance backend system 116 can communicate with the cloud 102 to backup data to the cloud 102, receive management instructions from the cloud 102, obtain software and/or configuration updates, send or receive alerts, etc. The cloud 102 can also send management instructions to the client devices 120 and/or the assistance backend system 116 to manage network communications, bandwidth, workloads, and/or parameters, such as quality-of-service (QoS) parameters, class-of-service (CoS) parameters, bandwidth and/or resource allocation instructions, etc., which can be used for prioritization of data, communications, and/or services.

In some implementations, the cloud 102 can provide artificial intelligence (AI), machine learning services, detection and recognition services (e.g., facial recognition, object recognition, gesture recognition, image recognition, speech recognition, impact detection, etc.), etc., to the client devices 120 and/or the assistance backend system 116. For example, the client devices 120 can communicate to the cloud 102 data collected by one or more sensors on the client devices 120 (e.g., images, sound, video, radar returns, structured-light data, motion measurements, tracking measurements, impact measurements, location measurements, etc.), which the cloud 102 can use to provide AI, recognition, detection, and/or other intelligence and calculations pertaining to an event (e.g., an assistance or emergency event) to the client devices 120 and/or the assistance backend system 116. Since the cloud 102 can have a large amount of compute resources and intelligence capabilities, some or all of such tasks can be offloaded to the cloud 102 (from the client devices 120 and/or the assistance backend system 116) for increased efficiency, performance, quality, etc., and to reduce the amount of resources such as compute, power or battery resources on the client devices 120 and/or the assistance backend system 116.

Figure 2:
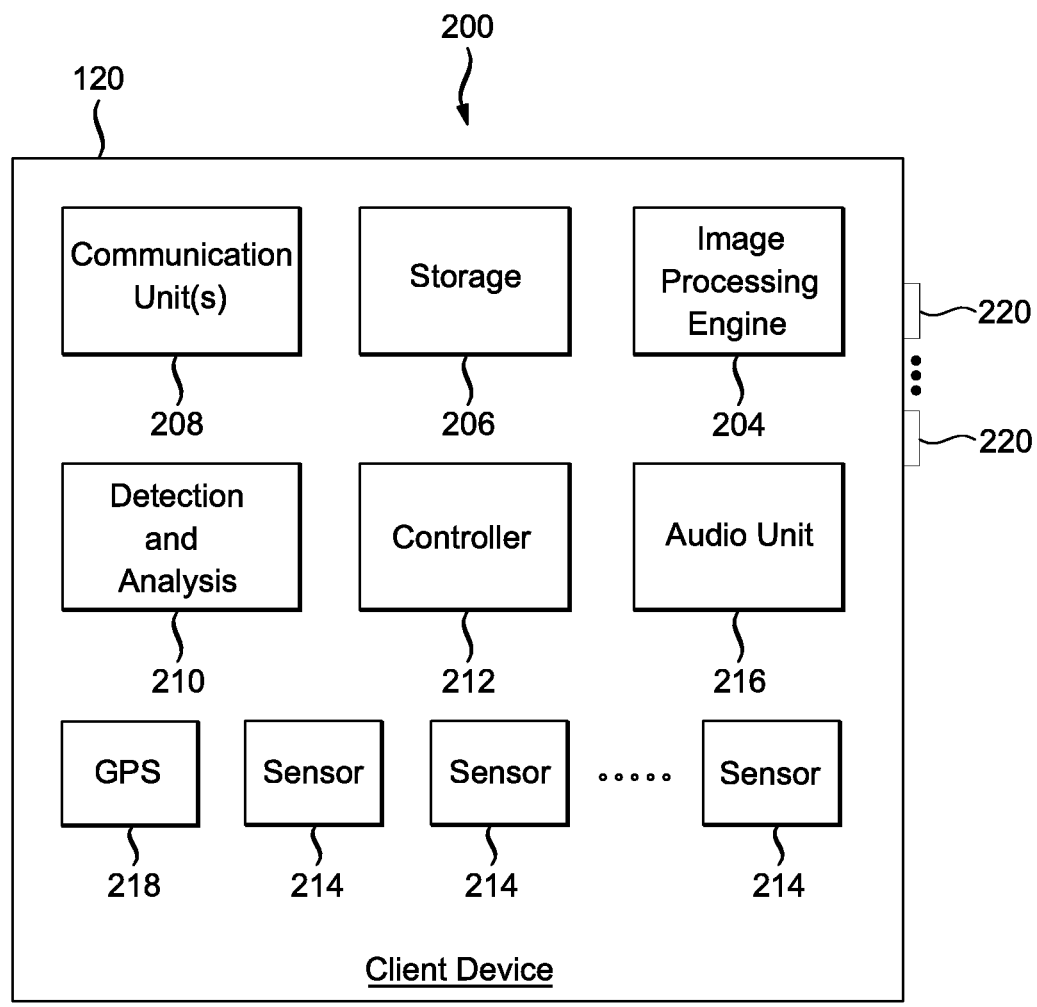
FIG. 2 illustrates an example client device for a personal emergency assistance system, in accordance with some examples.

FIG. 2 illustrates an example configuration 200 of client device 120. In this example, the client device 120 includes an image processing engine 204, a storage 206, a communication unit(s) 208, a detection and analysis engine 210, a controller 212, sensors 214, an audio unit 216, a GPS unit 218, and input elements 220 (e.g., buttons). Moreover, in some cases, the client device 120 can also include other components, such as, for example and without limitation, a filtering engine, a front-end processing engine, a machine learning engine, a maps engine, a tracking engine, etc.

The components of the client device 120 can include and/or can be implemented using electronic circuits or other electronic hardware, such as, for example and without limitation, one or more programmable electronic circuits (e.g., microprocessors, graphics processing units (GPUs), digital signal processors (DSPs), central processing units (CPUs), image signal processors (ISPs), and/or any other suitable electronic circuits), and/or can include and/or can be implemented using computer software, firmware, or any combination thereof, to perform the various operations described herein. While the client device 120 is shown to include certain components, one of ordinary skill will appreciate that the client device 120 can include more or fewer components than those shown in FIG. 2. For example, in some instances, the client device 120 can also include one or more memory components (e.g., one or more RAMs, ROMs, caches, buffers, and/or the like) and/or processing devices that are not shown in FIG. 2.

The image processing engine 204 can provide one or more image and video processing capabilities based on image data obtained by the client device 120 from an image or camera sensor (e.g., 214). For example, the image processing engine 204 can process image data to generate frames of pixels and process the frames to enhance, recognize, and/or adjust the image content. The image processing engine 204 can also perform other image and video processing capabilities such as, for example, video encoding/decoding, filtering, pixel correction, enhancement, focusing, brightness adjustment, resolution adjustment, trimming, etc.

The client device 120 can include sensors 214 for detecting various signals and conditions, such as image sensors, motion sensors, noise sensors, light sensors, flame detection sensors, proximity sensors, biosensors, machine vision sensors, video sensors, smart scene sensors, tracking sensors, speech recognition sensors, multimodal sensors, hall effect sensors, speed sensors, smoke sensors, metal detector sensors, explosive detection sensors, impact sensors, shock sensors, pressure sensors, moisture sensors, heat sensors, position sensors, tilt sensors, air flow sensors, chemical sensors, gyroscopes, accelerometers, inertial measurement units (IMU), radar sensors, light-emitting sensors, LIDARs, etc. The sensors 214 can include hardware and/or software sensors, as well as other components such as processors, memory, etc.

The client device 120 can also include one or more audio units 216. The audio units 216 can include audio speakers, microphones, audio signal processing elements, etc. The audio units 216 can capture and detect sound, and determine sound characteristics, such as source, localization, intensity, timing cues, spectral cues, patterns, etc. For example, the audio units 216 can include one or more microphones to detect audio and can include logic to recognize the audio (e.g., human, environmental, etc.), recognize the level or intensity of the audio, identify the location or origin of the audio, identify the direction and distance of the audio, recognize speech, recognize specific types of sounds, etc.

Data calculated or collected from the sensors 214 and audio unit 216 can be provided to the detection and analysis unit 210, which can use such data, including any image and/or video data captured by the sensors 214, to detect specific characteristics or conditions in the content of any of the captured data, detect objects and events, recognize scenes, recognize people, and perform other detection or recognition operations.

For example, the detection and analysis unit 210 can analyze various aspects of the captured data, such as pixels, frames, sound, images, frame sequences, sensor data, etc., to perform detection operations. Non-limiting examples of detection operations can include tamper detection, impact detection, human detection (e.g., facial recognition), emotion detection, object-in-hand detection, sound classification, video segmentation, object recognition, motion detection, event detection, lighting detection, smart scene detection, smoke detection, gesture recognition, speech recognition, etc.

The storage 206 can include one or more storage and/or memory devices for storing captured, collected, and/or generated data, such as video and image data recorded by a sensor (214) on the client device 120, metadata associated with the data, sensor data and/or measurements, recognition data, maps, geolocation information, environmental data, contact information, application data, assistance information, user information, event information, logs, communications or messages, GPS data, GIS data, tracking data, notifications, etc. The storage 206 can include one or more solid state storage devices, disk storage devices, and/or any type of storage or memory devices.

The communications unit(s) 208 can include one or more network or communications interfaces for communicating with other devices over a network, such as the cloud 102, the assistance backend system 116, user contacts, third-party services, government agencies, etc. The communication unit(s) 208 can include wireless and/or wired network interfaces. For example, in some cases, the communication unit(s) 208 can include a wireless network interface card for communicating with other devices via a wireless network (e.g., WIFI), an antenna to communicate over radio and/or a cellular network, a Bluetooth communications interface, an NFC interface, etc. The client device 120 can send and receive data to and from other networks and devices via the communication unit(s) 208.

The controller 212 can include rules, policies, logic, instructions, etc., to manage assistance requests, communications, data, and related operations. The operations can include, for example, localization operations, detection operations, operations for prioritizing communication channels and data, operations for triggering assistance requests or prompting the user to initiate assistance requests based on one or more factors (e.g., damage risk factors or levels, detected threats, detected distress conditions, etc.), timing of communications, selection of communications destinations, managing master-slave operations and migrations, managing resources, etc. The controller 212 can process the storage data, detected conditions, stored rules and settings, sensor data, and other factors to determine when to initiate an assistance request or prompt the user to initiate an assistance request, which data to generate and/or communicate as part of an assistance request, where to communicate the data, how to prioritize the transmission of data and assistance requests, how to prioritize different communications channels or interfaces, when to trigger an assistance request, how to deliver assistance requests and/or associated data, how to reduce bandwidth for a data communication and/or increase performance of communication links or channels, etc.

The controller 212 can also include rules or instructions for communicating with other devices, generating assistance requests, responding to assistance request communications, checking conditions, etc. In some cases, the controller 212 can request or exchange data from other networks, devices and/or information sources to use in assessing threats, identifying data of interest, determining what data to communicate with an assistance request or session, determining where to send an assistance request and/or associated data, etc.

The GPS unit 218 can obtain location coordinates to track or estimate a location of the client device 120 (and associated user). The client device 120 can store GPS data in storage 206, send the GPS data to a destination associated with an assistance request (e.g., assistance backend system 116), and/or provide the GPS data from the GPS unit 218 to a processing element (e.g., controller 212) for use in refining the location of the client device 120 (and the associated user). For example, the client device 120 can obtain location coordinates from the GPS unit 218 and cross-check the coordinates with specific locations (e.g., cities, states, countries, locales, municipalities, addresses, buildings, landmarks, reference points, etc.) to refine the location of the client device 120. As another example, the client device 120 can obtain GPS data from the GPS unit 218 and calculate a more accurate location of the client device 120 using WI-FI data (e.g., IP address, WI-FI network location information, etc.), cellular data (e.g., triangulation), etc.

The components shown in FIG. 2 are non-limiting examples provided for clarity and explanation purposes. It should be noted that other configurations can include more or less components, including components that are not shown in FIG. 2 but would be recognized by one of skill in the art.

Figure 3:
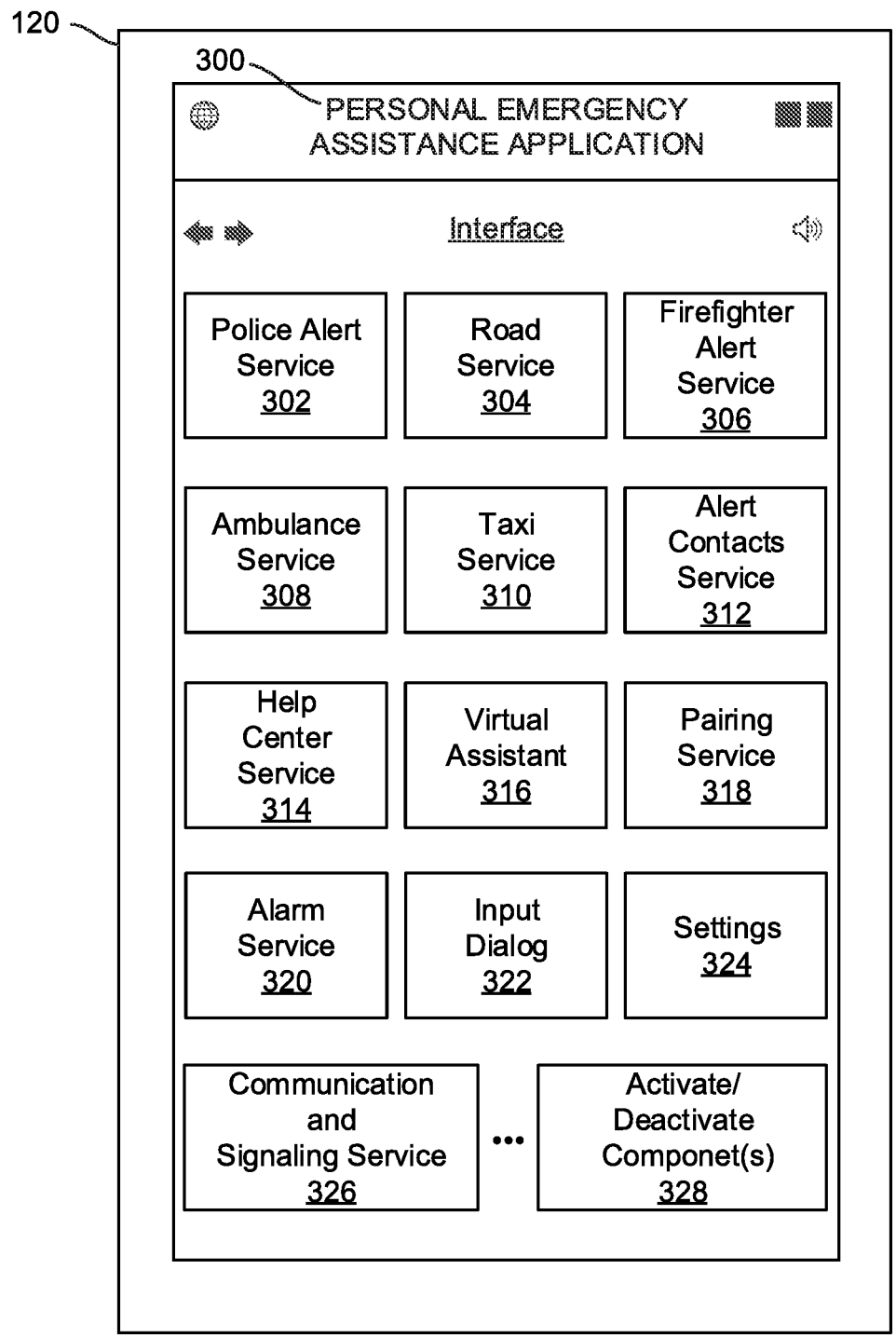
FIG. 3 illustrates an example client application for a personal emergency assistance system, in accordance with some examples.

FIG. 3 illustrates an example personal emergency assistance (PEA) application 300 on the client device 120 for assistance and emergency services. The PEA application 300 can be implemented on any client device (e.g., 120A, 120B) used for personal emergency assistance services as described herein. Moreover, the PEA application 300 can be used to generate assistance requests, send and receive assistance request signals and communications, communicate with the assistance backend system 116, communicate with the cloud 102, communicate with other devices or networks, receive assistance information and notifications, generate and/or receive alerts, initiate different types of assistance requests, send assistance requests to different assistance services or destinations, manage assistance services, configure assistance request services and settings, etc.

The PEA application 300 can include different services, features and functionalities (e.g., 302-328) to allow a user to quickly and easily (e.g., through a one or two touch or input mechanism, in an automated fashion, etc.) select and initiate a particular type of service or functionality that is relevant to a particular assistance or emergency event or need. For example, the different services, features and functionalities (302-328) of the PEA application 300 can allow the user to quickly initiate a particular type of assistance request for a particular type of event or situation without wasting time navigating through numerous pages or prompts to access the assistance request features for that particular type of event or situation, and without having to remember or lookup the contact number or address associated with the destination system for that particular type of assistance request or situation.

In the example shown in FIG. 3, the PEA application 300 includes a police alert service feature 302. The police alert service feature 302 can be programmed to allow the user to select or activate the police alert service feature 302 from the PEA application 300 (e.g., from the home page or main interface, through speech input, from a button on the client device, etc.), which can initiate a police assistance request. The police assistance request can be transmitted to a preconfigured police assistance address or number, such as a police department or the assistance backend system 116, or can be dynamically routed to a selected address or number for requesting police assistance. The request can be dynamically routed based on one or more factors such as, for example, a location of the client device 120, a connectivity state of the client device 120, a type of police assistance request, an urgency of the request, a police assistance priority list, a bandwidth or link to one or more police assistance destinations, an estimated request speed and/or response speed associated with one or more police assistance destinations, etc.

The PEA application 300 can include a road service feature 304. The road service feature 304 can be programmed to allow the user to select or activate the road service feature 304 from the PEA application 300 (e.g., from the home page or main interface, through speech input, from a button on the client device, etc.), which can initiate or trigger a roadside service request. The roadside service request can be transmitted to a preconfigured roadside service address or number, such as a roadside assistance service or the assistance backend system 116, or can be dynamically routed to a selected address or number for requesting roadside assistance (e.g., towing, car repairs, etc.). The request can be dynamically routed based on one or more factors such as, for example, a location of the client device 120, a connectivity state of the client device 120, a type of roadside assistance needed, an urgency of the request, a roadside assistance service priority list, a bandwidth or link to one or more roadside assistance services or destinations, an estimated request speed and/or response speed associated with one or more roadside assistance services or destinations, etc.

The PEA application 300 can include a firefighter service feature 306. The firefighter service feature 306 can be programmed to allow the user to select or activate the firefighter service feature 306 from the PEA application 300 (e.g., from the home page or main interface, through speech input, from a button on the client device, etc.), which can initiate or trigger a firefighter service request. The firefighter service request can be transmitted to a preconfigured firefighter service address or number, such as a firefighter assistance service or the assistance backend system 116, or can be dynamically routed to a selected address or number for requesting firefighter assistance. The request can be dynamically routed based on one or more factors such as, for example, a location of the client device 120, a connectivity state of the client device 120, a type of firefighter assistance needed, an urgency of the request, a firefighter assistance service priority list, a bandwidth or link to one or more firefighter assistance services or destinations, an estimated request speed and/or response speed associated with one or more firefighter assistance services or destinations, etc.

The PEA application 300 can include an ambulance service feature 308. The ambulance service feature 308 can be programmed to allow the user to select or activate the ambulance service feature 308 from the PEA application 300 (e.g., from the home page or main interface, through speech input, from a button on the client device, etc.), which can initiate or trigger an ambulance service request. The ambulance service request can be transmitted to a preconfigured ambulance service address or number, such as an ambulance service or the assistance backend system 116, or can be dynamically routed to a selected address or number for requesting ambulance services. The request can be dynamically routed based on one or more factors such as, for example, a location of the client device 120, a connectivity state of the client device 120, a type of ambulance service needed, an urgency of the request, an ambulance services priority list, a bandwidth or link to one or more ambulance services or destinations, an estimated request speed and/or response speed associated with one or more ambulance services or destinations, etc.

The PEA application 300 can include a taxi service feature 310. The taxi service feature 310 can be programmed to allow the user to select or activate the taxi service feature 310 from the PEA application 300 (e.g., from the home page or main interface, through speech input, from a button on the client device, etc.), which can initiate or trigger a taxi service request. The taxi service request can be transmitted to a preconfigured taxi service address or number, such as a taxi service or the assistance backend system 116, or can be dynamically routed to a selected address or number for requesting taxi service. The request can be dynamically routed based on one or more factors such as, for example, a location of the client device 120, a connectivity state of the client device 120, a type of taxi service needed, an urgency of the request, a taxi service priority list, a bandwidth or link to one or more taxi services or destinations, an estimated request speed and/or response speed associated with one or more taxi services or destinations, etc.

The PEA application 300 can include an alert contacts service feature 312. The alert contacts service feature 312 can be programmed to allow the user to select or activate the alert contacts service feature 312 from the PEA application 300 (e.g., from the home page or main interface, through speech input, from a button on the client device, etc.), which can initiate or trigger an alert or assistance request to one or more of the user's contacts. The contacts can include any contact (e.g., name, phone number, email, address, etc.) programmed on the client device 120 and/or accessible by the client device 120 (e.g., from an email service, from the cloud 102, from another device, etc.). The alert contacts service feature 312 can call, message, email, or otherwise alert any of the user's contacts. In some cases, the user can have a selected number of contacts defined as default contacts to be contacted when the alert contacts service feature 312 is activated. This way, the user does not have to waste time selecting a contact(s) to communicate with during an emergency. In other cases, the user can be prompted to select one or more specific contacts manually.

In yet other cases, the alert contacts service feature 312 can broadcast an alert or request to all or a subset of contacts, which can increase the likelihood and speed of obtaining a response and/or assistance, or can automatically select one or more contacts based on one or more factors such as, for example, a location of the client device 120, a connectivity state of the client device 120, a type of assistance needed, an urgency of the request, a contacts priority list, a known or predicted availability of one or more contacts, an estimated request speed and/or response speed associated with one or more contacts, etc.

The PEA application 300 can include a help center service feature 314. The help center service feature 314 can be programmed to allow the user to select or activate the help center service feature 314 from the PEA application 300 (e.g., from the home page or main interface, through speech input, from a button on the client device, etc.), which can initiate or trigger a help center service request. The help center service request can be transmitted to the assistance backend system 116 for processing. The assistance backend system 116 can in response provide a variety of help center services, such as information services, emergency services, assistance dispatch services, assistance relay or routing services, and/or any other help services.

In some cases, the PEA application 300 can include a virtual assistant feature 316. The virtual assistant feature 316 can be programmed to allow the user to select or activate the virtual assistant feature 316 from the PEA application 300 (e.g., from the home page or main interface, through speech input, from a button on the client device, etc.), to initiate or trigger a virtual assistant session. The virtual assistant session can allow a user to communicate with a virtual assistant, which can be an intelligent virtual assistance software agent or bot. The virtual assistant can perform a variety of operations such as, for example, dispatching different types of assistance services or personnel, routing calls or requests from the user to pertinent destinations (e.g., assistance providers, assistance personnel, government agencies or personnel, help centers, dispatchers, etc.), collecting information from the user (e.g., prompting the user to provide certain information associated with an event), answering questions from the user, providing instructions or suggestions to the user for taking particular actions (e.g., escaping or exiting a scene, providing or obtaining medical help, avoiding dangers, etc.), providing information and/or updates to the user, etc.

In some cases, the virtual assistant feature 316 can perform triage operations associated with an event to identify and/or prioritize the assistance suitable for a particular event. In other examples, the virtual assistant feature 316 can guide the user in determining which assistance feature (e.g., 302-314) may be most suitable for the assistance request, the emergency event, the type of assistance, and/or the needs of the user. For example, if the user is unsure which assistance feature is most suitable for a particular assistance event or request or the user is unsure which assistance service to contact for help, the virtual assistance feature 316 can gather data about the user, the event, the assistance requested or needed, and/or any other pertinent information to determine which assistance feature in the PEA application 300 is most suitable for that particular situation or which assistance services or personnel to contact. The virtual assistance feature 316 can then suggest to the user one or more assistance features in the PEA application 300 or which assistance services or personnel to contact.

In some cases, the virtual assistance feature 316 can provide one or more suggestions (e.g., a single suggestion, multiple suggestions, a ranked or prioritized list of suggestions, etc.) to the user and allow the user to select a suggestion. Upon the user selecting a suggestion, the virtual assistance feature 316 can activate a selected feature (e.g., 302-314) in the PEA application 300 and/or initiate an assistance request or communication to an assistance service or personnel selected by the user. In other examples, the virtual assistance feature 316 can automatically select the assistance feature (e.g., 302-314) in the PEA application 300 determined or predicted by the virtual assistant to be the most suitable assistance feature for the particular situation, and/or can automatically initiate an assistance request or communication to an assistance service or personnel determined or predicted by the virtual assistant to be the most suitable for the particular situation.

In some cases, the virtual assistant can be configured to check various factors and/or conditions when providing one or more suggestions to the user or automatically selecting a suggestion. For example, the virtual assistant can check the state/status of one or more communication interfaces on the client device 120 (e.g., a connectivity or coverage associated with one or more communication channels or interfaces, a bandwidth associated with one or more communication channels or interfaces, a performance or throughput associated with one or more communication channels or interfaces, etc.), the status of the user (e.g., is the user injured, is the user in imminent threat of death or serious bodily injury), whether there is an imminent threat to property, whether there is an imminent threat to the public, what type of dangers or threats are involved (if any), what type of assistance or assistance services and personnel is best suited for the particular situation, what are the conditions or context associated with the situation or event, etc.), and so forth. The virtual assistance can use the information about the factor(s) and/or condition(s) checked to generate one or more suggestions (e.g., suggested assistance features, suggested assistance services or personnel, suggested courses of action, etc.).

In some cases, the PEA application 300 can include a pairing service 318 for wirelessly (e.g., via Bluetooth, etc.) pairing the client device 120 with other client devices. For example, the pairing service 318 can be used by a user to pair client device 120A with client device 120B in order to enable or establish direct, wireless communications between the client device 120A and the client device 120B. The direct, wireless communications enabled or established through the pairing service 318 can allow the paired client devices to exchange data (e.g., GPS data, sensor data, user data, etc.); load balance and/or distribute PEA operations (e.g., collecting data; refining or combining location information; refining, combining, and/or fusing one or more types of sensor data; generating and/or sending assistance requests; performing detection and/or recognition operations; storing data and/or backups; providing alerts and notifications; etc.); coordinate assistance activity and/or communications; load balance, vary and/or distribute use of resources (e.g., load balance, vary, and/or distribute the use of network bandwidth, communication channels or interfaces, compute resources, etc.); coordinate redundancy or fault tolerance strategies (e.g., coordinate master-slave device roles for collecting data, sending data, backing up data, generating assistance requests, conducting assistance request tasks and/or communications, etc.); and so forth.

For example, once direct, wireless communications are established between the client device 120A and the client device 120B through the pairing service 318, the client devices can coordinate which client device obtains GPS data for determining a user's location and which device performs other operations (e.g., refining the GPS location information, generating an assistance request, etc.) in order to conserve battery life on the client devices and/or improve the efficiency of the various tasks. As another example, once paired, the client device 120A and the client device 120B can coordinate which client device(s) should transmit assistance requests (and/or other communications), how such assistance requests and/or communications should be transmitted (e.g., when, which communication channel(s) or interface(s), etc.), etc. To illustrate, in some cases, the client device 120A and the client device 120B can communicate wirelessly with each other to determine that both client devices should attempt to send an assistance request and/or associated communications (via a same or different communication channel or interface) for redundancy and increased likelihood of safe arrival. In other cases, the client device 120A and the client device 120B can communicate wirelessly with each other to determine that one client device should send an assistance request and/or associated communications over a specific communication channel or interface while the other client device sends (e.g., simultaneously, at a particular time or interval, in a particular order, etc.) the assistance request and/or associated communications over a different communication channel or interface and/or performs other operations (e.g., collecting data, receiving alerts or notifications, performing calculations, tracking the user, etc.).

The PEA application 300 can also include an alarm service 320. The alarm service 320 can issue alarms or notifications for the user and/or generate alarms to ward off a threat such as an attacker or an animal. The alarm service 320 can generate visual, textual and/or audio alarms, depending on the circumstances. For example, in some circumstances, such as if the user is hiding or trying to avoid attracting attention, the alarm service 320 can generate visual and/or textual alarms or cues to avoid attracting unwanted attention. As another example, in some circumstances, the alarm service 320 can generate an audio alarm (the user can configure the loudness of the alarm) to try to scare or ward off a threat or get the attention of any nearby person.

In some cases, the alarm service 320 can be triggered upon a user's manual input or request (e.g., via text, speech, etc.). In other examples, the alarm service 320 can be triggered automatically based on one or more factors, such as a location of the user, a movement of the user (e.g., running, erratic movement, sitting, laying down, etc.), a context of the situation (e.g., location, time of day, current events, crime factors in the area, threat levels, etc.), a detected or recognized condition or factor (e.g., a detected impact, a detected threat, a facial recognition result, a detected scene, a detected gesture, a detected object, etc.), and so forth.

The PEA application 300 can also include an input dialog 322. The input dialog 322 can include an input interface or option for the user to provide inputs, such as input information (e.g., user information, location information, event information and/or conditions, assistance needs and/or information, status information, threat information, updates, descriptions, settings, etc.), requests, selections, questions, etc. The input dialog 322 can be configured to obtain text input from the user, speech input (which the input dialog 322 can recognize through speech recognition and language processing), image/video input, etc. In some cases, the input dialog 322 can generate prompts for the user providing information or suggestions to the user and/or requesting information or selections from the user.

The input dialog 322 can provide prompts based on manual requests from the user, based on a dialog (and/or associated semantics) between the user and the input dialog 322 (and/or any other feature or person, such as the virtual assistant 316), and/or automatically based on one or more factors, such as a status of an assistance request, a status or state of an event, a context, event and/or environment conditions, a detected threat, a sequence of events or actions, detected activity, a triggering action or condition, etc. In some cases, the input dialog 322 can include a natural language processing and/or speech processing engine configured to output speech or utterances, receive and recognized user speech or utterances, generate output dialog or speech responsive to the user's input speech or utterances, etc. This way, the user can provide input and receive information through speech, without having to necessarily provide an input or participate in a dialog through text.

The PEA application 300 can include a settings 324 feature where the user can configure settings and/or behavior of the PEA application 300 (and any of the features provided by the PEA application 300). For example, the settings 324 can allow the user to configure or select one or more communication channels or interfaces to use for assistance communications, configure communication channel or interface priorities, configure assistance preferences, configure user information, configure contact information, enable or disable assistance features or services, configure default actions and/or messages, configure assistance request templates, configure assistance workflows, specify one or more assistance services and/or providers, etc.

For example, in some cases, a user can program through the settings 324 the client device to "play dead" (e.g., appear to be turned off or not functioning) when a particular threat(s) or threat level(s) is detected or encountered in order to fool any nearby attackers or perpetrators into thinking that the client device is not functioning. While the client device is in play dead mode, the client device can secretly continue operating. For example, the client device can secretly capture or collect data such as audio/sounds, video/images, location information, sensor measurements, etc.; generate and/or transmit assistance requests and/or associated communications; receive, send, and process information; report tracking information; backup data on the client device; etc.

The PEA application 300 can include a communication and signaling service 326. The communication and signaling service 326 can broadcast alert or assistance request signals, manage communication channels or interfaces used for communicating during an assistance event, generate different types of communications or messages for transmission, select which communication channels or interfaces to use during an assistance event, designate priorities or communication attempt sequences or ordering for different communication channels or interfaces, etc.

The PEA application 300 can also include activate/deactivate feature 328 for activating and deactivating any components, such as sensors, on the client device 120. For example, the user can use the activate/deactivate feature 328 to enable or disable a camera on the client device 120, a microphone on the client device 120, a network interface or antenna on the client device 120, a radar sensor on the client device 120, an IMU on the client device 120, a GPS unit on the client device, a light-emitting sensor on the client device 120, a speaker on the client device 120, a resource on the client device 120, etc.

The features shown in FIG. 3 are non-limiting examples provided for clarity and explanation purposes. It should be noted that other configurations can include more or less features or components, including features or components that are not shown in FIG. 3 but would be recognized by one of skill in the art. For example, in some cases, the PEA application 300 can include a maps feature where a user can access a map (which can include updates and context information associated with the assistance event), a browser feature where the user can browse the Internet and online sites, a search feature where the user can search for data or services, a tracking feature which can display tracking information associated with the user and/or the assistance event, a news feature, a social networking feature where the user can access one or more social networking sites and communicate with other users on the one or more social networking sites (e.g., the user can post help requests, event information, status information, updates, localization information, etc.), and so forth.

Moreover, when a user initiates or activates a particular assistance service feature or application component (e.g., 302-320), the PEA application 300 can track a status and information associated with a corresponding assistance request or action, such as whether the request was received, whether the request was processed, whether assistance has been dispatched, an estimated time of arrival of the dispatched assistance, associated alerts and notifications, associated assistance data, a progress associated with the assistance request, etc. In some cases, the PEA application 300 can display a map to the user showing the location of the assistance event, the location of the assistance provider, the location of dispatched services, nearby places (e.g., hospitals, police departments, emergency personnel, public transportation stations, locales, etc.), nearby streets, exit or escape routes, traffic information, nearby landmarks, map information, etc.

In some examples, the PEA application 300 can provide visual or sound alerts to notify the user of a status of an assistance request and/or relevant information associated with the assistance event or request. For example, the client device 120 and/or the PEA application 300 can display a red light to indicate that an assistance request was not received or failed to be processed, a yellow light to indicate that an assistance request was received but assistance has not yet been dispatched or initiated, and a green light to indicate that an assistance request has been received and assistance has been dispatched. As another example, the PEA application 300 can provide different sounds, alerts, or speech utterances to notify the user of a status of an assistance request (e.g., failed status, received status, received and dispatched status, etc.) and/or any other information. The visual or sound alerts and information can provide a quick and simple way to convey information to the user during an emergency, so the user is apprised of the assistance status and does not have to waste time trying to access such information by other means.

Figure 4:
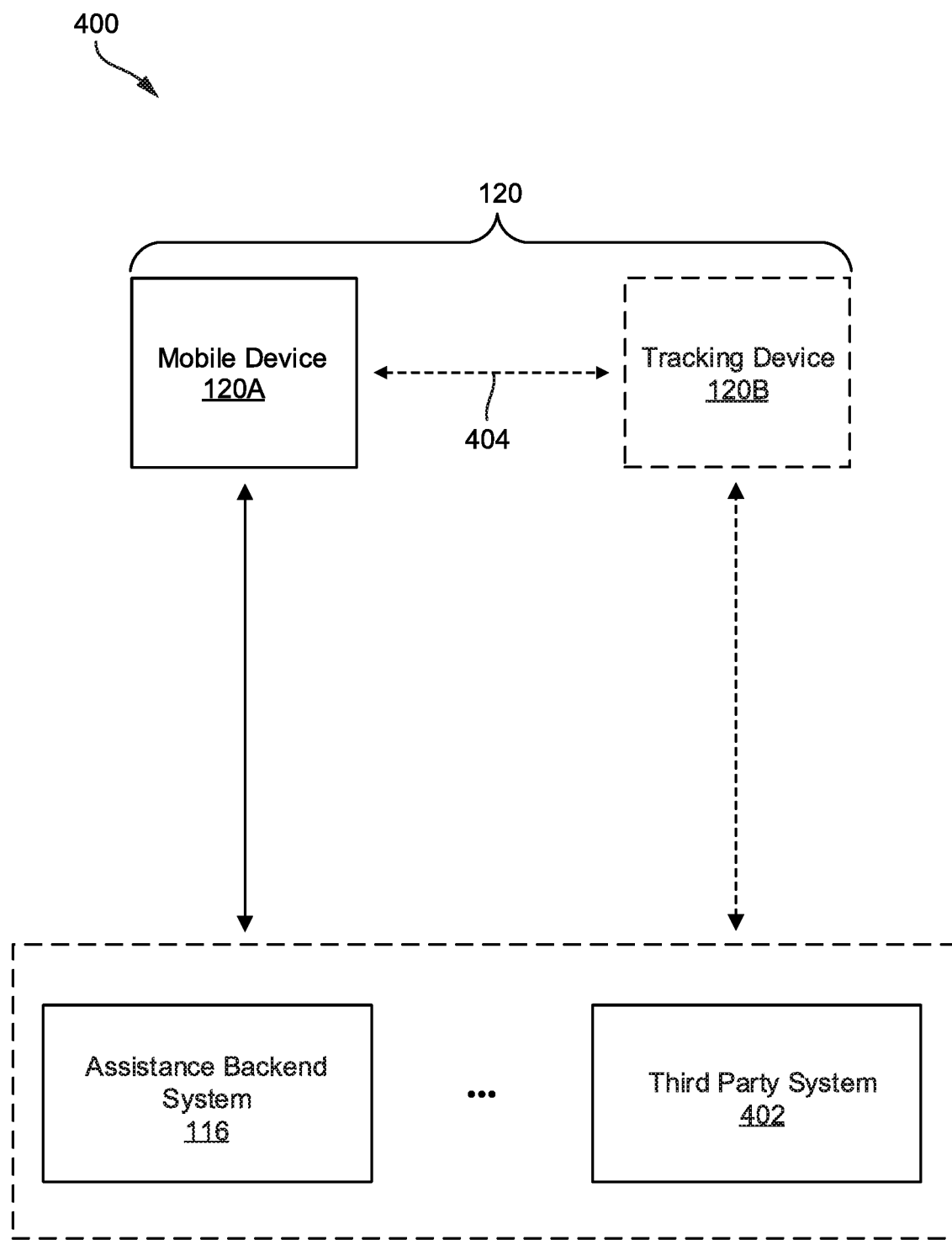
FIG. 4 illustrates a diagram of example communications between client devices and remote destinations in an example personal emergency assistance implementation.

FIG. 4 illustrates an example dual-client configuration 400 for assistance and emergency services. In this example, the client device 120A can be a mobile device, such as a smartphone or tablet computer, running the PEA application 300, and the client device 120B can be a tracking device, such as a USB GPS stick, which the user can carry along with the client device 120A for use with the client device 120A for assistance and emergency services. In some cases, the client device 120B can also run the PEA application 300 for assistance and emergency services.

The client device 120A and the client device 120B can establish a peer-to-peer wireless communication link 404 to exchange data and/or coordinate assistance operations or actions. For example, the client device 120A and the client device 120B can use the peer-to-peer wireless communication link 404 to load balance or distribute operations and/or communications between the client devices. To illustrate, in some cases, to conserve battery on the client device 120A, the client device 120A can offload GPS operations (e.g., obtaining GPS data and/or calculations) to the client device 120B. The client device 120B can then communicate to the client device 120A any GPS data obtained through the peer-to-peer wireless communication link 404. The client device 120A can obtain the GPS data without having to waste compute and battery resources to obtain such data.

In this example, the client device 120A can use the GPS data to report location information to a remote system or party (e.g., assistance backend system 116, the cloud 102, a third party or service, etc.). In some cases, the client device 120A can use the GPS data from the client device 120B to refine a location of the user. For example, the client device 120A can receive GPS coordinates and use other data (e.g., WI-FI data, triangulation data, map data, tracker data, etc.) to map the coordinates to a specific location(s) (e.g., a city, a state, a neighborhood, a landmark, a building, a locale, a street, etc.) and/or refine the location information to a more specific or precise location (e.g., an address, etc.).

In some examples, the client device 120A and the client device 120B can use the peer-to-peer wireless communication link 404 to coordinate other operations, tasks, settings, behavior, etc. For example, the client device 120A and the client device 120B can use the peer-to-peer wireless communication link 404 to coordinate which client device should send communications such as assistance requests to the assistance backend system 116 and/or the third party system 402 (e.g., whether one device should be the primary communications device, whether both devices should be used for assistance communications for redundancy, whether the devices should implement a sequence/order or scheme for sending or establishing (or attempting to send or establish) assistance communications, whether both devices should attempt to use (periodically, simultaneously, in order, and/or in any other fashion) different communication channels or interfaces to vary the communications and signaling efforts and mechanisms used in order to increase a likelihood of success in reaching a destination, etc.).

In another example, the client device 120A and the client device 120B can use the peer-to-peer wireless communication link 404 to coordinate master-slave roles of the client devices. For example, in some cases, client device 120A can be programmed to function as a master or primary device for collecting certain data, generating and/or sending assistance requests and/or associated communications, performing certain operations, etc.; and client device 120B can be programmed to function as a slave or secondary device for any operations or tasks. In some cases, while the client device 120B is in slave or secondary mode, it can continue to collect relevant data (e.g., from sensors on the client device 120B, from client device 120A, from the cloud 102, etc.) and/or perform relevant tasks/operations to remain up-to-date in case the client device 120B has to take over the master or primary role (e.g., in the case of a failure experienced by the client device 120A).

If the client device 120B detects a role migration triggering event, such as a failure or unresponsiveness by the client device 120A, the client device 120B can take over the master or primary role. When the client device 120B takes over the master or primary role (and/or before doing so), the client device 120B can ping or probe the client device 120A to determine if the client device 120B is able to communicate with the client device 120A (e.g., via the peer-to-peer wireless link 402 or any other channel). For example, the client device 120B can request and/or listen for heartbeats (e.g., signals) from the client device 120A to determine if the client device 120A is operating properly and/or whether the client device 120B should migrate to a master or primary role.

If the client device 120B is able to communicate with client device 120A but nevertheless determines that it should take over as the master or primary device (e.g., because client device 120A experiences a failure or error, because the client device 120A is able to communicate via the peer-to-peer wireless link 402 but is not able to communicate with other remote devices over a network such as WI-FI or a cellular network, etc.), the client device 120B can inform the client device 120A that it is taking over as the master or primary device and/or can obtain any relevant data on the client device 120A to continue assistance operations and communications. Upon receiving notice that the client device 120B is taking over (or has taken over) the master or primary role, the client device 120A can revert to a slave or secondary role until the issue experienced by the client device 120A which caused the migration is resolved and/or upon another migration triggering event (e.g., user switching device roles, client device 120B experiencing a failure, etc.).

The client device 120A and the client device 120B can communicate with the assistance backend system 116 and/or any third party system 402 (e.g., emergency services system or dispatcher, help center, police department, a device of a contact of the user, etc.) to initiate assistance requests and services and communicate or exchange relevant information (e.g., location information, user information, event information, threat information, context information, environment information, status information, tracking information, alerts, instructions, updates, etc.).

The client device 120A and the client device 120B can communicate with the assistance backend system 116 and/or the third party system 402 via one or more respective communication links or channels, such as WI-FI, cellular, radio, etc. In some cases, the client device 120A and the client device 120B can implement different communications channels, protocols, interfaces, etc., such as different cellular networks or protocols, for example.

In some implementations, when the user wants to issue or send an assistance request to the assistance backend system 116 and/or the third party system 402, the user can use both client devices 120A, 120B to attempt to send the assistance request and/or associated communications (simultaneously, in a particular order or sequence, and/or in any other fashion) for added redundancy and to increase the likelihood of communication success. The client devices can use the same or different communication channel(s) or protocol(s) when attempting to communicate with the assistance request and/or associated communications. For example, to increase redundancy or the likelihood of success, the client device 120A can attempt to communicate with assistance backend system 116 and/or the third party system 402 using a cellular connection (e.g., LTE, 4G, 5G, etc.) while the client device 120B attempts to communicate with the assistance backend system 116 and/or the third party system 402 using a different communications channel or protocol, such as WI-FI or a different cellular network.

In some cases, the client device 120A and the client device 120B can each iteratively check each connection or communications interface on the device to select a respective connection or communications interface to use to attempt to communicate with the assistance backend system 116 and/or the third party system 402. Each device can select a connection or communications interface based on, for example, a respective communication quality (e.g., bandwidth, performance, stability, coverage, etc.) and/or availability associated with each connection or communications interface. This way, each device can select and use the connection or communications interface that has the best performance and/or the highest likelihood of success at that particular time, thus maximizing the overall chances of success in reaching the assistance backend system 116 and/or the third party system 402 through the client device 120A and/or the client device 120B.

In some cases, when a client device attempts to use one connection or interface to communicate with the assistance backend system 116 and/or the third party system 402 and determines that the connection or communications transmitted using that particular connection or interface failed (or a response was never received suggesting a possibility of packets missing or failing to reach the target destination), the client device can retry to communicate with the assistance backend system 116 and/or the third party system 402 using another connection or interface (if available).

If the client device success in communicating using the other connection or interface, the client device can continue using that connection or interface unless a failure/error is subsequently experienced or the client device determines that a different connection or interface is more suitable (e.g., has a stronger or more stable connection, has a better performance, etc.). If the client device instead fails again when using the other connection or interface, the client device can iteratively continue checking other connections or interfaces available. If the client device checks all available connections or interfaces and determines that they all have failed, after checking the last connection or interface (or attempting to use), the client device can loop back to the first connection or interface checked to perform another check of that connection or interface, and similarly continue iteratively checking connections or interfaces as necessary.

Figure 5A:
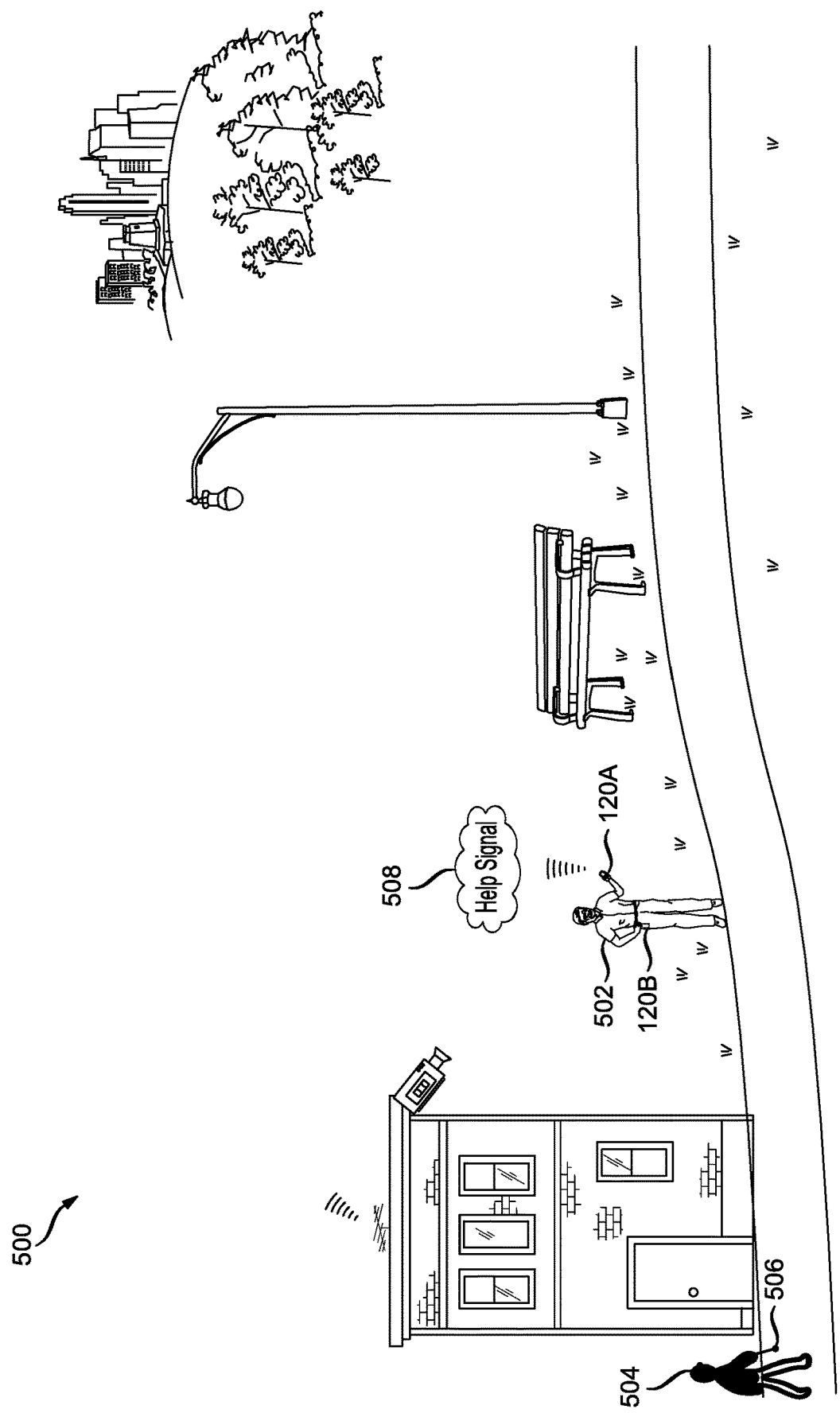
FIG. 5A illustrates an example use scenario of a personal emergency assistance system, in accordance with some examples.

FIG. 5A illustrates an example use case scenario 500 for personal emergency assistance using client devices 120 and PEA application 300. In this example, a user 502 has client device 120A running PEA application 300 and client device 120B which can also run PEA application 300. In some examples, client device 120A can be the user's smartphone or mobile device, and client device 120B can be another device carried by the user 502 or attached to the user's clothing, such as a mobile GPS unit, a USB GPS stick or keychain device, or a small device implementing one or more sensors (e.g., a camera, an IMU, a GPS receiver, a microphone, etc.) and one or more communications interfaces (e.g., a Bluetooth interface, a cellular antenna, an NFC interface, a WI-FI interface, a radio antenna, etc.).

In use case scenario 500, the user 502 is being approached by another user 504. The user 504 is carrying an object 506 which appears to be a weapon or an object that can be used as a weapon. Given the object 506 carried by the user 504 and/or other characteristics such as a clothing worn by the user 504 (e.g., black clothing, a mask, etc.), a gesture by the user 504 (e.g., an aggressive gesture), a movement by the user 504 (e.g., fast or erratic movement or walking), characteristics of the environment (e.g., high crime area, dark, etc.), the user 504 can be perceived to pose a threat or danger to the user 502. The user 502, the client device 120A, and/or the client device 120B can detect or perceive such threat based on all the different cues (e.g., visual cues, noise, context, etc.). Based on the detected threat, the user 502, the client device 120A, and/or the client device 120B can initiate an assistance request 508.

The assistance request 508 can include a help signal and any relevant data collected/calculated by the client devices 120 and/or the user 502, such as location information, user information, a description of the event or circumstances, a description of the user 504, a timestamp, etc. Moreover, the assistance request 508 can request, and/or be directed to, a specific type of assistance service based on the type of threat and/or assistance requested. For example, the assistance request 508 can request, and/or be directed to, a security or police assistance service which can help or protect the user 502 from the perceived threat (e.g., user 504).

The assistance request 508 can be initiated via PEA application 300 and/or a button on a client device (e.g., 220). In this example, the assistance request 508 is being transmitted by client device 120A. If the client device 120A determines that the assistance request 508 did not reach the intended destination (or has been unable to confirm safe receipt within a threshold period of time), the client device 120A can retry to send the assistance request 508 via the same connection or interface or a different connection or interface available on the client device 120A. In some cases, despite the client device 120A sending the assistance request 508, the client device 120B can also attempt to send an assistance request via one or more connections or interfaces on the client device 120B. This way, both client devices 120 can be leveraged for sending assistance requests in order to maximize the likelihood of successfully reaching the intended target and maximize the speed at which the assistance request is communicated (e.g., one device may have more bandwidth or a better or faster connection that can be used to reach the intended target faster).

Once the assistance request 508 reaches the intended target (e.g., assistance backend system 116), the user 502 can receive the requested assistance. The client device 120A and/or 120B can track the status of the requested assistance and the location of the user 502. The client device 120A and/or 120B can continue to receive any information or updates from the assistance service, and can continue to provide relevant updates and information, such as location updates, event updates, activity updates, threat information, etc.

Figure 5B:
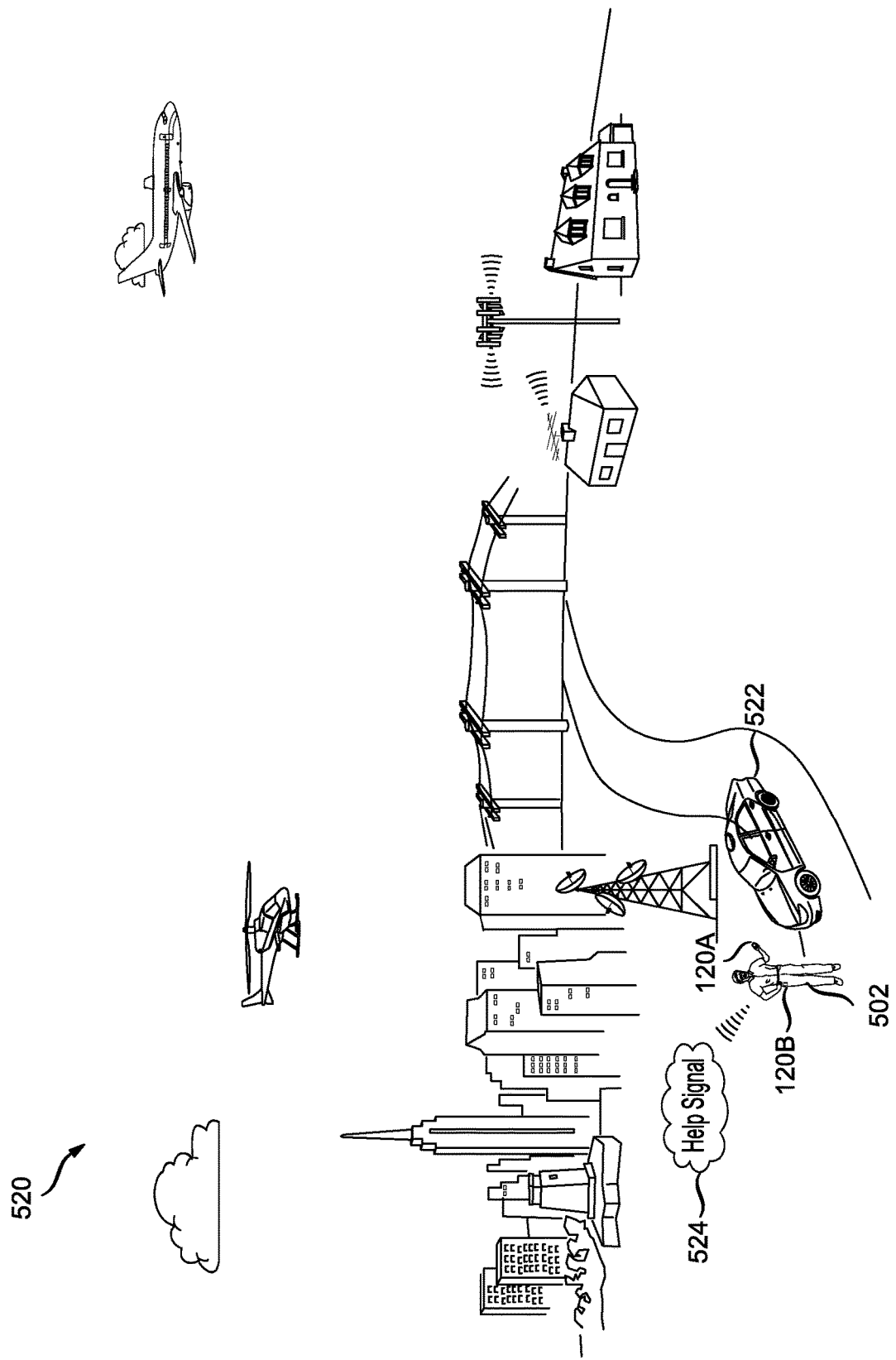
FIG. 5B illustrates another example use scenario of a personal emergency assistance system, in accordance with some examples.

FIG. 5B illustrates another example use case scenario 520 for personal emergency assistance using client devices 120 and PEA application 300. As in the previous example, the user 502 here has client device 120A running PEA application 300 and client device 120B which can also run PEA application 300. The use case scenario 520 show the user 502 having problems with a car 522 and needing roadside assistance (e.g., car repairs, towing, etc.). To obtain roadside assistance, the user can use the client device 120A and/or the client device 120B to send the assistance request 524 for roadside assistance. The assistance request 524 can include the location of the user 502 (e.g., provided by the user and/or calculated by the client device 120A and/or the client device 120B), a type of assistance requested (e.g., roadside), user information (e.g., name, contact, description, etc.), vehicle information (e.g., car description), a timestamp, etc.

The assistance request 524 can be routed to a specific roadside assistance provider, such as a roadside service provided or dispatched by the assistance backend system 116 or a third-party roadside assistance service. In some cases, the assistance request 524 can be routed to an assistance request destination selected based on a location of the user 502, a type of assistance requested, a type of car 522, etc. This way, the assistance request 524 can be intelligently processed to obtain the fastest and/or most suitable help. Where the assistance request 524 is sent or routed can be determined by the user 502 (e.g., the user 502 can identify where the request should be sent or routed), by the client device 120A and/or 120B (e.g., based on a location of the user 502, a type of assistance requested, etc.), or can depend on the service feature (302-328) in the PEA application 300 selected by the user 502. For example, if the user 502 activates the roadside service feature 304 in the PEA application 300, the assistance request 524 can be automatically routed to a roadside assistance service associated with, or selected by, the roadside service feature 304.

Having disclosed example system components and concepts, the disclosure now turns to the example method 600 for requesting assistance in an emergency situation, as shown in FIG. 6. The steps outlined herein are examples and can be implemented in any combination thereof, including combinations that exclude, add, or modify certain steps.

At step 602, detecting, at one or more client devices (e.g., 120) associated with a user (e.g., 502), a need for assistance associated with the user. The need for assistance can be associated with an event, such as a criminal event (e.g., a burglary, an assault, an attack, a kidnapping, a threat, etc.), a natural event (e.g., a fire, a storm, a tornado, a flood, a natural disaster, etc.), an emergency (e.g., an accident, a medical emergency, a roadside emergency, etc.), and/or any other event prompting a need for assistance.

In some cases, the need for assistance can be determined based on a user input on a client device (e.g., 120A, 120B). For example, the need for assistance can be determined based on a user input specifying the need for assistance or a user selection of a specific service assistance feature (e.g., 302-316) on a personal emergency application (e.g., 300) running on the client device. In other cases, the need for assistance can be determined by the one or more client devices and/or a remote system (e.g., the cloud 102, the assistance backend system 116, etc.) based on one or more recognition operations such as, for example and without limitation, object recognition, gesture recognition, motion detection, facial recognition, scene recognition, image recognition, speech recognition, noise recognition, emotion recognition, proximity detection, smoke detection, fire detection, impact detection, water or moisture detection, etc.

For example, the one or more client devices can implement one or more sensors (e.g., a camera, an audio sensor, an image sensor, an IMU, a gyroscope, an accelerometer, a motion sensor, a smoke detector, a fire detector, a water detector, an impact sensor, a proximity sensor, a GPS device, etc.) to collect sensor data or measurements, and use the sensor data or measurements to perform recognition operations to detect a context associated with the user (e.g., an environment, a time, a location, nearby objects, nearby humans, nearby animals, user activity, movement, etc.), a threat posed by one or more humans (e.g., a threat posed by a person with a weapon, a threat posed by a person making threatening gestures or movements, a threat posed by a person identified through facial recognition, etc.), a threat posed by one or more animals, a threat posed by a natural event or disaster (e.g., a tornado, a storm, an earthquake, a flood, a landslide, a fire, etc.), an emergency situation (e.g., an accident, a medical emergency, a roadside emergency, etc.), and so forth.

In some cases, the one or more client devices can capture sound (e.g., audio, speech, noise, etc.), video, and/or one or more images, and perform recognition operations to determine a threat, condition, or need for assistance based on the sound, video and/or one or more images. For example, the one or more client devices can recognize speech in captured audio to determine a potential threat or condition based on the speech detected; perform image or scene recognition based on the video and/or the one or more images to detect an individual (e.g., via facial recognition), detect a gesture and/or movement of the individual to determine a potential threat or aggression, detect conditions surrounding the user (e.g., environmental conditions, activity, movement, etc.), detect an object such as a weapon or a vehicle, detect one or more features in the video and/or one or more images; detect specific characteristics of noise captured by the one or more client devices (e.g., noise levels, type of noise, etc.); and/or perform any other detection operation to determine a potential threat, condition, and/or need for assistance.

In response to detecting a potential threat, condition, and/or need for assistance, the one or more client devices can automatically or intelligently perform any of the steps 604-612 described below. The one or more client devices can use a personal emergency application (e.g., 300) to implement any of the steps 604-612 described below. For example, the one or more client devices can activate or execute one or more features (e.g., 302-328) on the personal emergency application (e.g., 300) to automatically perform any of the steps 604-612.

At step 604, the method 600 can include determining, via the one or more client devices associated with the user, a location associated with the user and a type of assistance needed. The one or more client devices can determine the location based on, for example, GPS data, triangulation data, WIFI data, user input data, map data, tracker data, etc. Moreover, the one or more client devices can determine the type of assistance needed based on a user input (e.g., an input defining a type of assistance needed, an event associated with the user, a threat perceived by the user, a condition associated with the user, etc.), a detected condition or context, a detected event, a detected threat or danger, etc. The user can provide input for the method 600 via speech utterances, text, one or more input devices (e.g., touchscreen, keyboard, touchpad, buttons, etc.), and/or any other input means.

At step 606, the method 600 can include selecting a communications interface (e.g., cellular antenna, a wireless network interface, a radio antenna, a transceiver, etc.) on the one or more client devices for transmitting an assistance request (e.g., 508, 520) over a network. The communications interface can be selected based on a respective connectivity status associated with one or more communications interfaces on the one or more client devices, a respective bandwidth associated with the one or more communications interfaces, a respective performance associated with the one or more communications interfaces, a respective network coverage associated with the one or more communications interfaces, a respective wireless signal associated with the one or more communications interfaces, a respective state or status associated with the one or more communications interfaces, a respective operational capacity or state associated with the one or more communications interfaces, and/or any other factor indicative of a speed, performance, quality, connectivity, available, and/or current communications capabilities associated with the one or more communications interfaces.

In some cases, the one or more client devices can select the communications interface by comparing status, connectivity, availability, performance, etc., of different communications interfaces on the one or more client devices to select the optimal communications interface (e.g., the communications interface with the fastest, most reliable, and/or strongest connection) for transmitting the assistance request. Each client device can perform iterative checks on its communication interface(s) to determine interface status information and select an optimal or functioning communications interface. In some cases, the one or more client devices can select multiple communications interfaces to send multiple instances of the assistance request through multiple and/or different types of communications interfaces, networks, channels, etc., to increase redundancy and reliability.

At step 608, the method 600 can include transmitting, to a destination system (e.g., assistance backend system 116, third party system 402) associated with an assistance service, the assistance request via the communications interface selected. The assistance request can include the location associated with the user, the type of assistance needed, and/or any other information relevant to the assistance requested such as, for example, user information, sensor data obtained by the one or more client devices (e.g., one or more images, one or more videos, audio, IMU data, GPS data, GIS data, motion measurements, position and/or location measurements, radar returns, measured object or scene characteristics, etc.), recognition results (e.g., object recognition, facial recognition, scene recognition, threat detection, smoke detection, light detection, fire detection, flood detection, speech recognition, noise recognition, image recognition, activity recognition, emotion recognition, etc.), user input(s), environment information, event information, threat information, a description of surrounding or nearby objects or humans or conditions, a description of the assistance need, a date and/or time associated with the event, and/or any other relevant information.

Moreover, the assistance request can be transmitted from one client device (e.g., 120A or 120B) or both client devices (120). For example, in some cases, only client device 120A may transmit the assistance request. However, in some cases, client device 120B can subsequently attempt to transmit the assistance request if the client device 120A is unable (e.g., within a threshold period of time, within a threshold number of attempts, within a timeout period, etc.) to successfully transmit the assistance request, obtain adequate network connectivity when trying to send the assistance request, and/or reach the target destination.

As another example, in other cases, both the client device 120A and the client device 120B may attempt to transmit the assistance request. The client devices 120 can attempt to send the assistance request simultaneously, in parallel, in a particular sequence or order, randomly or as ready, and/or in any other way or transmission scheme. In some cases, the client devices 120 can attempt to send the assistance request using a same type of network, channel, interface, networking protocol, and/or mechanism. In other examples, the client devices 120 can attempt to send the assistance request using different networks, channels, interfaces, networking protocols, and/or mechanisms to increase the likelihood of at least one transmission reaching the destination and to potentially increase the speed of transmission/delivery (e.g., one of the assistance requests may reach the target destination faster when using different networks, channels, interfaces, networking protocols, and/or mechanisms as they may vary in bandwidth, connectivity strength, load on the communications link or network, path traversed by each assistance request from the source to the destination, etc.).

In some cases, the client device 120A and/or the client device 120B can make multiple attempts to transmit the assistance request. For example, if a client device transmits the assistance request and does not receive a response within a threshold period of time (e.g., a timeout period, a predefined interval, etc.) and/or is unable to confirm safe receipt of the assistance request (e.g., within a threshold period of time or confirmation attempts), the client device can retry to transmit the assistance request either using the same communications interface (and/or network/channel or protocol) or using a different communications interface (and/or network/channel or protocol). The client device can continue trying to reach the target destination by retransmitting the assistance request (e.g., using the same and/or different communications interface, network/channel, protocol, etc.).

In some case, if a client device fails to reach the destination with the transmitted assistance request, the client device can retransmit the assistance request to a different destination, such as a different third party system, a different address associated with an assistance service, a different system and/or address of the assistance backend system 116, a different device, etc. The client device can retransmit the assistance request to the different destination after, for example, a first communication failure or attempt, a threshold period of time (e.g., a period of time without receiving a response/confirmation, a period of time without being able to confirm safe delivery, etc.), a threshold number of transmission attempts or failures, a threshold number of failed attempts to confirm safe receipt, etc.

At step 610, the method 600 can include exchanging one or more assistance updates between the one or more client devices and the destination system. The one or more assistance updates can include, for example, location updates, event updates, a status of the assistance request, a status of an assistance response, an updated recognition result (e.g., updated object recognition, updated facial recognition, updated scene recognition, updated detected activity, updated sensor measurements, updated threat detection results, updated speech recognition, updated noise detection, updated gesture or emotion recognition, etc.), user updates, updates associated with one or more conditions, etc. In some cases, the one or more client devices can provide updates to the destination system (e.g., the assistance backend system 116), which the destination system can use to track the user and/or one or more client devices, make any adjustments to the assistance response or plan, etc.

In some examples, the client devices 120 can also exchange information and/or updates with each other (e.g., via peer-to-peer wireless communication link 404). For example, the client devices 120 can exchange (in a bidirectional or unidirectional manner) sensor data or measurements, contact information, communications received (e.g., for an assistance provider and/or system), status information, user inputs, etc. In some cases, the client devices 120 can also use the communication link between the devices (e.g., 404) to coordinate tasks/operations, such as load balancing certain operations like recognition operations, sensing operations, data collection operations, communication operations, backup operations, etc. In some cases, the one or more client devices can also communicate with a cloud (e.g., 102) to send event information (e.g., sensor data, location information, user inputs, descriptive information, etc.) to the cloud and receive from the cloud recognition and intelligence results calculated by the cloud using the event information (and any other information such as Internet data, map data, news data, statistics, etc.). This way, the one or more client devices can offload the more compute and resource intensive and/or time consuming tasks to the cloud, and can leverage the cloud's greater resources (e.g., compute resources, application resources, etc.) to obtain intelligence from more complex calculations, algorithms, recognition operations, etc.

At step 612, the method 600 can include providing, via the one or more client devices, assistance information including at least a portion of the one or more assistance updates. The assistance information can be provided (e.g., to the user) by the one or more client devices via a display, a speaker, an LED (light-emitting diode), and/or any other output mechanism. For example, the one or more client devices can display a map tracking an assistance response or dispatched personnel. In another example, the one or more client devices can display visual cues indicating a status of the assistance request, the assistance response, the dispatched service or personnel, etc.

To illustrate, client device 120A can display a first color or pattern (e.g., red) to indicate that the assistance request was not received, a second color or pattern (e.g., yellow) to indicate that the assistance request was received but is still being processed, and a third color or pattern (e.g., green) to indicate that the assistance request was successfully received and processed and/or that assistance has been dispatched or is on the way (e.g., based on a confirmation that the assistance request was received and processed and/or assistance has been dispatched or is on the way).

The disclosure now turns to FIG. 7, which illustrates example computing hardware components, computing device hardware, and computing device configurations. In particular, FIG. 7 illustrates an example computing system architecture 700. The system architecture 700 can be implemented by one or more devices herein, such as client devices 120, one or more devices (e.g., 118) in the assistance backend system 116, etc. The system architecture 700 in this example includes components in electrical communication with each other using a connection 705, such as a bus. System architecture 700 includes a processing unit (CPU or processor) 710 and a system connection 705 that couples various system components including the system memory 715, such as read only memory (ROM) 720 and random access memory (RAM) 725, to the processor 710.

The system architecture 700 can include a cache of high-speed memory connected directly with, in close proximity to, or integrated as part of the processor 710. The system architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system architecture 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   detecting, at one or more client devices associated with a user, a need for assistance associated with the user, the need for assistance being associated with an event;
   determining, via the one or more client devices associated with the user, a location associated with the user and a type of assistance needed;
   selecting a communications interface on the one or more client devices for transmitting an assistance request over a network;
   transmitting, to a destination system associated with an assistance service, the assistance request via the communications interface selected, the assistance request specifying the location associated with the user and the type of assistance needed;
   obtaining, from one or more sensors on the one or more client devices, sensor data capturing one or more attributes associated with at least one of the user, the event, and an environment associated with the event, the data comprising at least one of image data, video data, and audio, the sensor data being obtained after the detecting of the need for assistance;
   communicating one or more assistance updates between the one or more client devices and the destination system, the one or more assistance updates comprising at least one of location updates, event updates, a status of the assistance request, the sensor data, and a status of an assistance response; and
   providing, via the one or more client devices, assistance information comprising at least a portion of the one or more assistance updates, the assistance information being provided via at least one of a display and a speaker associated with the one or more client devices, wherein the one or more client devices comprise a first mobile device and a second mobile device, and wherein transmitting the assistance request comprises:

identifying a first communications interface on the first mobile device having at least one of cellular coverage and network connectivity;

identifying a second communications interface on the second mobile device having at least one of cellular coverage and network connectivity;

transmitting a first copy of the assistance request via the first communications interface on the first mobile device; and transmitting a second copy of the assistance request via the second communications interface on the second mobile device, wherein the first copy of the assistance request and the second copy of the assistance request are sent at least one of simultaneously, in parallel, and in a specific sequence, wherein the first copy of the assistance request and the second copy of the assistance request are transmitted using at least one of different networks and different wireless protocols, the different networks and different wireless protocols comprising at least one of a first type of cellular network, a second type of cellular network, a WIFI network, a radio broadcast channel, a first wireless protocol, and a second wireless protocol.

2. The method of claim 1, wherein the assistance information comprises at least one of a first visual indication of the status of the assistance request, a second visual indication of the status of the assistance response, an audio alert, and tracking information associated with at least one of the user and a dispatched assistance provider.

3. The method of claim 1, wherein the need for assistance is detected based on an assistance feature selected from a plurality of different assistance features on an application on at least one of the one or more client devices, each assistance feature of the plurality of different assistance features corresponding to a different type of assistance.

4. The method of claim 3, wherein each of the plurality of different assistance features is configured to request a different type of assistance from a different assistance service associated with the different type of assistance, and generate, upon being activated, a respective assistance request addressed to a specific destination associated with the different assistance service, the assistance feature on the application being selected based on the type of assistance needed and the different assistance service associated with the assistance feature.

5. The method of claim 4, wherein the different type of assistance service comprises at least one of an ambulance service, a taxi service, a police assistance service, a roadside service, and an emergency service.

6. The method of claim 4, wherein the assistance feature on the application, when selected provides an option to send an assistance alert to one or more user contacts stored on the one or more client devices, the assistance alert comprising at least one of a call, an email message, and a text message.

7. The method of claim 1, wherein the location associated with the user is determined based on at least one of global positioning system (GPS) data, cellular triangulation, and data associated with a wireless network in communication with the one or more client devices.

8. The method of claim 1, wherein detecting the need for assistance comprises:

obtaining additional sensor data from the one or more sensors on the one or more client devices, the additional sensor data comprising at least one of additional image data, additional video data, additional audio, and radar returns;

based on the additional sensor data, performing one or more recognition operations comprising at least one of object recognition, gesture recognition, facial recognition, scene recognition, image recognition, speech recognition, noise recognition, and emotion recognition; and based on the one or more recognition operations, detecting a condition associated with the need for assistance, the condition comprising at least one of a threat and a danger level.

9. The method of claim 8, further comprising, in response to detecting the condition associated with the need for assistance:

determining, by the one or more client devices, the type of need for assistance based on the condition associated with the need for assistance;

selecting, by the one or more client devices, the communications interface for transmitting the assistance request;

based on the condition, selecting, by the one or more client devices, one of a plurality of assistance services supported by an application on at least one of the one or more client devices, the one of the plurality of assistance services being selected as an intended recipient of the assistance request; and transmitting, via the communications interface selected, the assistance request to the intended recipient of the assistance request, the intended recipient comprising the assistance service.

10. The method of claim 1, wherein the first mobile device comprises a GPS unit for determining location information and the second mobile device comprises one or more sensors, wherein the first mobile device and the second mobile device are separate standalone devices, the method further comprising:

offloading GPS operations to the first mobile device;

establishing a wireless communication link between the first mobile device and the second mobile device;

determining, by the second mobile device, the location based on GPS data received from the first mobile device;

selecting, by the second mobile device, the communications interface for transmitting the assistance request, the communications interface comprising a component on the second mobile device; and transmitting, by the second mobile device, the assistance request via the communications interface.

11. The method of claim 1, wherein at least one of the first mobile device and the second mobile device comprises a mobile phone.

12. The method of claim 1, wherein the one or more sensors comprise at least one of an image sensor and a microphone.

13. A system comprising:

one or more processors; and at least one computer-readable storage medium having stored therein instructions which, when executed by the one or more processors, cause the system to:

detect a need for assistance associated with a user, the need for assistance being associated with an event;

determine a location associated with the user and a type of assistance needed;

select a communications interface for transmitting an assistance request over a network;

transmit, to a destination associated with an assistance service, the assistance request via the communications interface selected, the assistance request specifying the location associated with the user and the type of assistance needed;

obtain, from one or more sensors associated with one or more client devices, sensor data capturing one or more attributes associated with at least one of the user, the event, and an environment associated with the event, the data comprising at least one of image data, video data, and audio, the sensor data being obtained after the detecting of the need for assistance;

communicate one or more assistance updates between the system and the destination, the one or more assistance updates comprising at least one of location updates, event updates, a status of the assistance request, the sensor data, and a status of an assistance response; and provide assistance information comprising at least a portion of the one or more assistance updates, the assistance information being provided via at least one of a display and a speaker associated with the one or more client devices, wherein the one or more client devices comprise a first mobile device and a second mobile device, and wherein transmitting the assistance request comprises:

identifying a first communications interface on the first mobile device having at least one of cellular coverage and network connectivity;

identifying a second communications interface on the second mobile device having at least one of cellular coverage and network connectivity;

transmitting a first copy of the assistance request via the first communications interface on the first mobile device; and transmitting a second copy of the assistance request via the second communications interface on the second mobile device, wherein the first copy of the assistance request and the second copy of the assistance request are sent at least one of simultaneously, in parallel, and in a specific sequence, wherein the first copy of the assistance request and the second copy of the assistance request are transmitted using at least one of different networks and different wireless protocols, the different networks and different wireless protocols comprising at least one of a first type of cellular network, a second type of cellular network, a WIFI network, a radio broadcast channel, a first wireless protocol, and a second wireless protocol.

14. The system of claim 13, wherein the assistance information comprises at least one of a first visual indication of the status of the assistance request, a second visual indication of the status of the assistance response, an audio alert, and tracking information associated with at least one of the user and a dispatched assistance provider, wherein the location associated with the user is determined based on at least one of global positioning system (GPS) data, cellular triangulation, and data associated with a wireless network in communication with the system.

15. The system of claim 13, wherein the need for assistance is detected based on an assistance feature selected from a plurality of different assistance features on an application, each assistance feature of the plurality of different assistance features corresponding to a different type of assistance.

16. The system of claim 15, wherein the plurality of different assistance features is associated with different types of assistance services, the different types of assistance services comprising at least one of an ambulance service, a taxi service, a police assistance service, a roadside service, and an emergency service, wherein at least one of the plurality of different assistance features comprises an option which, when selected, sends an assistance alert to one or more user contacts, the assistance alert comprising at least one of a call, an email message, and a text message.

17. The system of claim 16, wherein detecting the need for assistance comprises:

obtaining additional sensor data from the one or more sensors, the additional sensor data comprising at least one of motion data, image data, video data, audio, and radar returns;

based on the additional sensor data, performing one or more recognition operations comprising at least one of object recognition, gesture recognition, motion detection, facial recognition, scene recognition, image recognition, speech recognition, noise recognition, and emotion recognition;

based on the one or more recognition operations, detecting a condition associated with the need for assistance, the condition comprising at least one of a threat and a danger level; and in response to detecting the condition associated with the need for assistance:

determining the type of need for assistance based on the condition associated with the need for assistance;

selecting the communications interface for transmitting the assistance request;

based on the condition, selecting one of the different types of assistance services as an intended recipient of the assistance request; and transmitting, via the communications interface selected, the assistance request to the intended recipient of the assistance request, the intended recipient comprising the assistance service.

18. The system of claim 16, further comprising the first mobile device and the second mobile device, wherein the first mobile device comprises a GPS unit for determining location information and the second mobile device comprises one or more sensors, wherein the first mobile device and the second mobile device are separate devices.

19. The system of claim 18, the at least one computer-readable storage medium containing instructions which when executed cause the system to:

offload GPS operations to the first mobile device;

establish a wireless communication link between the first mobile device and the second mobile device;

determine, by the second mobile device, the location based on GPS data received from the first mobile device;

select, by the second mobile device, the communications interface for transmitting the assistance request, the communications interface comprising a component on the second mobile device; and transmit, by the second mobile device, the assistance request via the communications interface.

20. At least one non-transitory computer-readable storage medium comprising instructions which, when executed by one or more processors, cause one or more computing devices to:

detect a need for assistance associated with a user, the need for assistance being associated with an event;

determine a location associated with the user and a type of assistance needed;

select a communications interface for transmitting an assistance request over a network;

transmit, to a destination associated with an assistance service, the assistance request via the communications interface selected, the assistance request specifying the location associated with the user and the type of assistance needed;
obtain, from one or more sensors on the one or more computing devices, sensor data capturing one or more attributes associated with at least one of the user, the event, and an environment associated with the event, the data comprising at least one of image data, video data, and audio, the sensor data being obtained after the detecting of the need for assistance;
exchange one or more assistance updates between the one or more computing devices and the destination, the one or more assistance updates comprising at least one of location updates, event updates, a status of the assistance request, sensor data and a status of an assistance response; and
provide assistance information comprising at least a portion of the one or more assistance updates, the assistance information being provided via at least one of a display and a speaker associated with the one or more computing devices, wherein the one or more computing devices comprise a first mobile device and a second mobile device, and wherein transmitting the assistance request comprises:
  identifying a first communications interface on the first mobile device having at least one of cellular coverage and network connectivity;
  identifying a second communications interface on the second mobile device having at least one of cellular coverage and network connectivity;
  transmitting a first copy of the assistance request via the first communications interface on the first mobile device; and
  transmitting a second copy of the assistance request via the second communications interface on the second mobile device, wherein the first copy of the assistance request and the second copy of the assistance request are sent at least one of simultaneously, in parallel, and in a specific sequence, wherein the first copy of the assistance request and the second copy of the assistance request are transmitted using at least one of different networks and different wireless protocols, the different networks and different wireless protocols comprising at least one of a first type of cellular network, a second type of cellular network, a WIFI network, a radio broadcast channel, a first wireless protocol, and a second wireless protocol.

21. A method comprising:
detecting, at one or more client devices associated with a user, a need for assistance associated with the user, the need for assistance being associated with an event, wherein the one or more client devices comprise a first mobile device and a second mobile device;
determining, via the one or more client devices associated with the user, a location associated with the user and a type of assistance needed;
selecting a communications interface on the one or more client devices for transmitting an assistance request over a network, the communications interface being selected based on at least one of a respective connectivity status associated with one or more communications interfaces on the one or more client devices, a respective bandwidth associated with the one or more communications interfaces, and a respective performance associated with the one or more communications interfaces;
transmitting, to a destination system associated with an assistance service, the assistance request via the communications interface selected, the assistance request specifying the location associated with the user and the type of assistance needed;
exchanging one or more assistance updates between the one or more client devices and the destination system, the one or more assistance updates comprising at least one of location updates, event updates, a status of the assistance request, and a status of an assistance response; and
providing, via the one or more client devices, assistance information comprising at least a portion of the one or more assistance updates, the assistance information being provided via at least one of a display and a speaker associated with the one or more client devices;
wherein transmitting the assistance request comprises:
  identifying a first communications interface on the first mobile device having at least one of cellular coverage and network connectivity, and a second communications interface on the second mobile device having at least one of cellular coverage and network connectivity;
  transmitting a first copy of the assistance request via the first communications interface on the first mobile device; and
  transmitting a second copy of the assistance request via the second communications interface on the second mobile device, wherein the first copy of the assistance request and the second copy of the assistance request are sent at least one of simultaneously, in parallel, and in a specific sequence, wherein the first copy of the assistance request and the second copy of the assistance request are transmitted using at least one of different networks and different wireless protocols, the different networks and different wireless protocols comprising at least one of a first type of cellular network, a second type of cellular network, a WIFI network, a radio broadcast channel, a first wireless protocol, and a second wireless protocol.

* * * * *